(12) United States Patent
Miyake

(10) Patent No.: US 9,494,066 B2
(45) Date of Patent: *Nov. 15, 2016

(54) CONTROL APPARATUS FOR AN INTERNAL COMBUSTION ENGINE

(75) Inventor: Teruhiko Miyake, Sunto-gun (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/004,065

(22) PCT Filed: Jun. 2, 2011

(86) PCT No.: PCT/JP2011/062672
§ 371 (c)(1),
(2), (4) Date: Sep. 9, 2013

(87) PCT Pub. No.: WO2012/164713
PCT Pub. Date: Dec. 6, 2012

(65) Prior Publication Data
US 2014/0130483 A1 May 15, 2014

(51) Int. Cl.
*F02M 25/06* (2016.01)
*F01N 3/18* (2006.01)
(Continued)

(52) U.S. Cl.
CPC .............. *F01N 3/18* (2013.01); *F01N 3/208* (2013.01); *F02D 21/08* (2013.01);
(Continued)

(58) Field of Classification Search
CPC .................. F01N 3/18; F01N 3/208; F01N 2900/1602; F02D 21/08; F02D
(Continued)

(56) References Cited

U.S. PATENT DOCUMENTS 6,021,640 A 2/2000 Hirota et al.
6,029,443 A 2/2000 Hirota et al.
(Continued)

FOREIGN PATENT DOCUMENTS

JP 9-324706 A 12/1997
JP 10-37742 A 2/1998
(Continued)

OTHER PUBLICATIONS

Election dated Feb. 20, 2014 from the United States Patent and Trademark Office issued in U.S. Appl. No. 13/514,752.
(Continued)

*Primary Examiner* — Jesse Bogue
*Assistant Examiner* — Matthew T Largi
(74) *Attorney, Agent, or Firm* — Sughrue Mion, PLLC

(57) ABSTRACT

A controller is provided for an engine comprising urea-SCR catalyst, a urea-water supply section, a low pressure gas recirculating section including a low pressure EGR pipe forming a low pressure EGR passage and a low pressure EGR valve. The controller controls an amount of a fuel supplied to the engine, and an opening degree of the low pressure EGR valve. The controller supplies the urea-water to the urea-SCR catalyst in such a manner that an ammonia flowing out from the urea-SCR catalyst neutralizes an acid condensed water produced by a gas passing through the low pressure EGR passage.

14 Claims, 17 Drawing Sheets

(51) Int. Cl.
*F01N 3/20* (2006.01)
*F02D 21/08* (2006.01)
*F02D 41/00* (2006.01)
*F02B 29/04* (2006.01)

(52) U.S. Cl.
CPC .......... *F02D 41/0055* (2013.01); *F02M 26/06* (2016.02); *F02M 26/15* (2016.02); *F02M 26/46* (2016.02); *F02M 26/47* (2016.02); *F01N 2900/1602* (2013.01); *F02B 29/0406* (2013.01); *F02M 26/05* (2016.02); *F02M 26/23* (2016.02); *F02M 26/50* (2016.02); *Y02T 10/24* (2013.01); *Y02T 10/47* (2013.01)

(58) Field of Classification Search
CPC ........................ 41/0055;F02M 25/0709; F02M 25/0718; F02M 25/0754; F02M 25/0755; F02M 25/0701; F02M 25/0707; F02M 25/0727; F02B 29/0406; Y02T 10/24; Y02T 10/47
USPC .......................................................... 60/285
See application file for complete search history.

(56) References Cited

U.S. PATENT DOCUMENTS

| | | | |
|---|---|---|---|
| 8,151,558 B2 | 4/2012 | Robel et al. | |
| 8,272,371 B2 | 9/2012 | Fasold et al. | |
| 2006/0086080 A1* | 4/2006 | Katogi ................... | F01N 3/035 60/278 |
| 2008/0060348 A1 | 3/2008 | Robel et al. | |
| 2008/0155972 A1* | 7/2008 | Driscoll et al. ................. | 60/299 |
| 2008/0158972 A1 | 7/2008 | Pan et al. | |
| 2008/0202101 A1* | 8/2008 | Driscoll ................. | F01N 3/035 60/286 |
| 2009/0038308 A1* | 2/2009 | Nagae ............................ | 60/602 |
| 2009/0193794 A1* | 8/2009 | Robel ................ | F02M 25/0718 60/295 |
| 2010/0083636 A1* | 4/2010 | Wang et al. .................... | 60/277 |
| 2010/0242928 A1* | 9/2010 | Fasold ................... | B01D 53/40 123/568.12 |
| 2012/0159934 A1* | 6/2012 | Itoh .................... | F02M 25/0709 60/279 |

FOREIGN PATENT DOCUMENTS

| | | |
|---|---|---|
| JP | 11-82182 A | 3/1999 |
| JP | 2003-232218 A | 8/2003 |
| JP | 2005127258 A | 5/2005 |
| JP | 2007182805 A | 7/2007 |
| JP | 2007-291974 A | 11/2007 |
| JP | 2007-315372 A | 12/2007 |
| JP | 2008-128115 A | 6/2008 |
| JP | 2008-144633 A | 6/2008 |
| JP | 2008261300 A | 10/2008 |
| JP | 2009-85011 A | 4/2009 |
| JP | 2009-92005 A | 4/2009 |
| JP | 2010-043585 A | 2/2010 |
| WO | 2007/136148 A1 | 11/2007 |
| WO | 2008/030314 A1 | 3/2008 |

OTHER PUBLICATIONS

Rejection dated May 2, 2014 from the United States Patent and Trademark Office issued in U.S. Appl. No. 13/514,752.
Notice of Allowance dated Dec. 23, 2015 from the United States Patent and Trademark Office issued in U.S. Appl. No. 14/568,585.
Communication dated Mar. 9, 2016 from U.S. Patent & Trademark Office in counterpart U.S. Appl. No. 14/568,585.
Communication dated Jan. 15, 2016 from the United States Patent and Trademark Office issued in corresponding U.S. Appl. No. 14/568,585.

* cited by examiner

CONTROL APPARATUS FOR AN INTERNAL COMBUSTION ENGINE

CROSS REFERENCE TO RELATED APPLICATIONS

This is a National Stage of International Application No. PCT/JP2011/062672, filed Jun. 2, 2011, the contents of all of which are incorporated herein by reference in their entirety.

TECHNICAL FIELD

The present invention relates to a control apparatus for an internal combustion engine having a urea-SCR catalyst in an exhaust passage of the engine.

BACKGROUND ART

A SCR (Selective Catalytic Reduction) catalyst is a catalyst which purifies nitrogen oxides (NOx) by reducing the nitrogen oxides with ammonia ($NH_3$). Especially, the SCR catalyst has started to be used for diesel engines which emit a comparatively large amount of nitrogen oxides. The SCR catalyst is referred to as a "NOx selective reduction catalyst."

Reducing nitrogen oxides by the SCR catalyst requires to supply ammonia which serves as a reduction agent for nitrogen oxides to the SCR catalyst. A conventional apparatus therefore supplies a water (urea-water, urea aqueous solution) containing urea ($CO(NH_2)_2=H_2N-CO-NH_2$) to the SCR catalyst, in place of ammonia. The urea changes into ammonia and carbon dioxides by hydrolysis in the urea-SCR catalyst. The ammonia thus obtained by the hydrolysis reduces the nitrogen oxides in the SCR catalyst (refer to Patent Literature 1). The system where the urea-water is supplied to the SCR catalyst may be referred to as a "Urea SCR system", and the SCR catalyst to which the urea-water is supplied may be referred to as a "urea-SCR catalyst."

Meanwhile, there has been developed an engine comprising a supercharger, a high-pressure EGR system, and a low-pressure EGR system. The high-pressure EGR system is an exhaust gas recirculation system in which a high pressure EGR pipe is provided, the high pressure EGR pipe communicating between a position upstream of a turbine in an exhaust passage and a position downstream of a compressor in an intake passage, and a high pressure exhaust gas (high pressure EGR gas) is recirculated through the high pressure EGR pipe to the intake passage. The low pressure EGR system is an exhaust gas recirculation system in which a low pressure EGR pipe is provided, the low pressure EGR pipe communicating between a position downstream of the turbine in the exhaust passage and a position upstream of the compressor in the intake passage, and a low pressure exhaust gas (low pressure EGR gas) is recirculated through the low pressure EGR pipe to the intake passage. A temperature of the high pressure EGR gas recirculated by the high pressure EGR system is high. Therefore, it is difficult to recirculate a large amount of the high pressure EGR gas when, for example, a load of the engine is high. In contrast, a temperature of the low pressure EGR gas recirculated by the low pressure EGR system is low. Therefore, a large amount of the low pressure EGR gas can be recirculated even when a large amount of the high pressure EGR gas can not be recirculated. Consequently, an amount of NOx discharged from the engine can be reduced (refer to Patent Literature 2).

CITATION LIST

Patent Literature

[Patent Literature 1]
Japanese Patent Application Laid-Open (kokai) No. 2005-127258
[Patent Literature 2]
Japanese Patent Application Laid-Open (kokai) No. 2008-261300

SUMMARY OF THE INVENTION

The low pressure EGR gas contains water vapor generated/produced through combustion of fuel. Further, the fuel and lubrication oil contain sulfur 5, and thus, the low pressure EGR gas contains sulfur oxide (SOx). Accordingly, when the low pressure EGR gas is cooled down by the low pressure EGR pipe, a low pressure EGR cooler disposed in the low pressure EGR pipe, an intake pipe, an intercooler disposed in the intake pipe, and the like, an acid condensed water is produced. This acid condensed water corrodes "members constituting the low-pressure EGR system which includes the low pressure EGR pipe, a low pressure EGR valve, the low pressure EGR cooler, and the like", "intake system members which include the intake pipe, the compressor, the intercooler, and the like", and inner walls of the combustion chambers (hereinafter, those are collectively referred to as "engine members"), and thus, the durability of the engine may be lowered. This problem occurs as long as the low-pressure EGR system is provided, even when the high-pressure EGR system is not provided. Accordingly, one of objects of the present invention is to provide a control apparatus for an internal combustion engine having the low-pressure EGR system, the apparatus being capable of reducing a possibility of corrosion of the engine members caused by the acid condensed water, by means of neutralizing the acid condensed water with ammonia produced by the urea-SCR catalyst.

The control apparatus (present invention apparatus) for an internal combustion engine according to the present invention comprises a fuel supply section for supplying a fuel to the engine, a urea-SCR catalyst, a urea-water supply section, a low pressure gas recirculating section, and a control section.

The urea-SCR catalyst is disposed in an exhaust passage of the engine. The urea-SCR catalyst purifies nitrogen oxides contained in an exhaust gas discharged from the engine by reducing the nitrogen oxides with ammonia produced from the "urea-water supplied to the urea-SCR catalyst."

The urea-water supply section supplies the urea-water to the urea-SCR catalyst.

The low pressure gas recirculating section includes a low pressure EGR pipe and a low pressure EGR valve.

The low pressure EGR pipe forms a low pressure EGR passage communicating between a position downstream of the urea-SCR catalyst in the exhaust passage and the intake passage of the engine.

The low pressure EGR valve is disposed/intervened in the low pressure EGR pipe and is configured in such a manner that its opening degree is varied so as to vary a passage cross sectional area of the low pressure EGR passage.

The control section controls an amount of the fuel supplied to the engine from the fuel supply section based on a parameter(s) indicative of an operating state of the engine.

The control section controls the opening degree of the low pressure EGR valve based on the parameter(s) indicative of the operating state of the engine.

The control section performs a "urea-water for reducing nitrogen oxides supply control to control an amount of the urea-water supplied from the urea-water supply section" based on the parameter(s) indicative of the operating state of the engine in such a manner that "ammonia of an amount estimated to be required to reduce nitrogen oxides contained in the exhaust gas" is produced/generated in the urea-SCR catalyst.

Further, the control section
(1) estimates, based on the parameter(s) indicative of the operating state of the engine, an amount (acid condensed water amount) of an acid condensed water, which is produced/generated by/from a gas passing through the low pressure EGR passage, and which is accumulated in the low pressure EGR passage and the intake passage;
(2) determines whether or not a specific condition is satisfied, the specific condition including a condition that the estimated amount of the acid condensed water is equal to or larger than an acid condensed water amount threshold; and
(3) performs, when the specific condition is determined to be satisfied, a control (urea-water for producing ammonia supply control) for a predetermined time to set an "amount of the urea-water which should be supplied from the urea-water supply section" to an amount larger than an "amount required for the urea-water for reducing nitrogen oxides supply control" so that ammonia flows out from the urea-SCR catalyst while a gas flowing out from the urea-SCR catalyst is passing through the low pressure EGR passage and flowing into the intake passage.

It should be noted that the predetermined time for which the urea-water for producing ammonia supply control is being carried out may be a time period/duration from a start of the control to a point in time at which a constant time elapses from the start, or a time period/duration from the start of the control to a point in time at which the estimated amount of the acid condensed water becomes equal to or smaller than an "amount smaller than the acid condensed water amount threshold by a predetermined amount."

According to the present invention apparatus, the urea-water for reducing nitrogen oxides supply control is carried out for/during a normal operating state of the engine, and therefore, the "urea-water whose amount is necessary and sufficient for purifying NOx contained in the exhaust gas" is supplied to the urea-SCR catalyst. As a result, NOx is purified. Meanwhile, when the estimated amount of the acid condensed water becomes equal to or larger than the acid condensed water amount threshold, the possibility that the engine members corrode becomes high. Accordingly, when the specific condition including the condition that the estimated amount of the acid condensed water becomes equal to or larger than the acid condensed water amount threshold becomes satisfied, the present invention apparatus changes the "amount of the urea-water which should be supplied from the urea-water supply section" to the amount larger than the "amount required for the urea-water for reducing nitrogen oxides supply control."

Accordingly, a part (when NOx is flowing into the urea-SCR catalyst) or all (when NOx is not flowing into the urea-SCR catalyst) of the ammonia produced in the urea-SCR catalyst flows out from the urea-SCR catalyst without being consumed to reduce NOx. At this time, since the gas flowing out from the urea-SCR catalyst passes through the low pressure EGR passage to flow into the intake passage of the engine, the ammonia flowing out from the urea-SCR catalyst passes through the low pressure EGR passage and flows into the intake passage. Therefore, the acid condensed water is neutralized by the ammonia. Consequently, the present invention apparatus can reduce the possibility of corrosion of the engine members.

In a first aspect of the present invention apparatus, the control section is configured,
so as to determine that the specific condition is satisfied when a condition that the engine is in a decelerating operating state is further satisfied; and
so as to stop, when the specific condition becomes satisfied, supplying the fuel from the fuel supply section, and so as to set the opening degree of the low pressure EGR valve to a predetermined opening degree larger than an opening degree of the low pressure EGR valve immediately before the specific condition becomes satisfied.

When the fuel supply is stopped, it is not necessary to consider worsening of the combustion state, and thus, a great amount of a gas can be recirculated into the intake passage through the low pressure EGR passage. In view of the above, the control section of the first aspect sets the low pressure EGR valve opening degree to the "predetermined opening degree (opening degree in the opening side, the opening degree being equal to or smaller than a fully opened opening degree and being larger than a fully closed opening degree) which is larger than the opening degree of the low pressure EGR valve immediately before the specific condition becomes satisfied", when the engine is in the decelerating operating state so that the fuel supply is stopped, and thereby when the specific condition becomes satisfied, so as to recirculate a great amount of the "gas containing the ammonia" flowed out from the urea-SCR catalyst into the intake passage. Consequently, the acid condensed water can be neutralized in a short time.

Further, the control apparatus of the first aspect comprises an exhaust throttle valve, which is disposed in the exhaust passage and at a position downstream of a connecting position of the low pressure EGR passage to the exhaust passage, and which varies a passage cross sectional area of the exhaust passage, wherein,
the control section is configured so as to change, when the specific condition is satisfied, an opening degree of the exhaust throttle valve to a predetermined opening degree smaller than an opening degree of the exhaust throttle valve immediately before the specific condition becomes satisfied.

As described above, it is not necessary to consider worsening of the combustion state, when the fuel supply is being stopped. Therefore, a great amount of the gas is allowed to be recirculated into the intake passage through the low pressure EGR passage. In view of the above, the control section of the first aspect changes, when the specific condition is satisfied and thus the fuel supply is stopped, the opening degree of the exhaust throttle valve into the "predetermined opening degree (opening degree in the closing side, the opening degree being equal to or larger than a fully closed opening degree and being smaller than a fully opened opening degree) which is smaller than the opening degree of the exhaust throttle valve immediately before the specific condition becomes satisfied", so as to recirculate a great amount of the "gas containing the ammonia" flowed out from the urea-SCR catalyst into the intake passage. Consequently, the acid condensed water can be neutralized in a shorter time.

Further, the control apparatus of the first aspect comprises a supercharger and a high pressure gas recirculating section.

The supercharger includes a turbine disposed in the exhaust passage and at a position upstream of the urea-SCR catalyst in the exhaust passage, and a compressor disposed in the intake passage and at a position downstream of a connecting position of the low pressure EGR passage to the intake passage so as to be rotated by the turbine.

The high pressure gas recirculating section includes a high pressure EGR pipe which forms a high pressure EGR passage communicating between a position upstream of the turbine in the exhaust passage and a position downstream of the compressor in the intake passage, and a high pressure EGR valve which is disposed in the high pressure EGR pipe. The opening degree of the high pressure EGR valve is varied so as to vary a passage cross sectional area of the high pressure EGR passage.

In addition, the control apparatus is configured so as to vary, when the specific condition becomes satisfied, the opening degree of the high pressure EGR valve to a certain opening degree of the high pressure EGR valve smaller than the opening degree of the high pressure EGR valve immediately before the specific condition becomes satisfied.

It is preferable, as the first aspect which includes the high pressure recirculating section described above, that the opening degree of the high pressure EGR valve be changed, when the specific condition is satisfied, and thus, when the fuel supply is stopped, to the predetermined opening degree (opening degree in the closing side, the opening degree being equal to or larger than a fully closed opening degree and smaller than a fully opened opening degree) which is smaller than the opening degree of the high pressure EGR valve immediately before the specific condition becomes satisfied. As a result, a greater amount of the "gas containing the ammonia" is made to be recirculated into the intake passage. Consequently, the acid condensed water can be neutralized in a shorter time.

Further, the control section of the first aspect is configured:

so as to include a urea-SCR catalyst bed temperature estimating section which estimates, based on the parameter(s) indicative of the operating state of the engine, a urea-SCR catalyst bed temperature which is a temperature of a bed of the urea-SCR catalyst; and so as to determine that the specific condition is satisfied when a condition that the estimated urea-SCR catalyst bed temperature is equal to or higher than a urea-SCR catalyst bed temperature threshold is further satisfied.

When the urea-SCR catalyst bed temperature is lower than a predetermined temperature (urea-SCR catalyst bed temperature threshold), the urea-water does not efficiently change into ammonia in the urea-SCR catalyst. Accordingly, it is not preferable that the urea-water for producing ammonia supply control be performed in such a case. In view of the above, if the control section is configured so as to determine that the specific condition is satisfied when the condition that the estimated urea-SCR catalyst bed temperature is equal to or higher than the urea-SCR catalyst bed temperature threshold is further satisfied, wasteful consumption of the urea-water can be avoided.

In a second aspect of the present invention apparatus, the control section is configured so as to perform a low pressure EGR gas recirculating control to have a low pressure EGR gas flowing out from the urea-SCR catalyst flow into the intake passage by varying the opening degree of the low pressure EGR valve based on the parameter(s) indicative of the operating state of the engine, when the fuel is supplied to the engine from the fuel supply section.

In a case in which the low pressure EGR gas recirculating control is being carried out, a large part of the gas containing the ammonia flowing out from the urea-SCR catalyst can be recirculated into the intake passage through the low pressure EGR gas passage, if a condition that a flow rate of the gas passing through the low pressure EGR passage is equal to or larger than a predetermined flow rate threshold is satisfied.

In view of the above, the control section is configured so as to determine that the specific condition is satisfied when a condition that the gas passing through the low pressure EGR passage is equal to or larger than the predetermined flow rate threshold is further satisfied while the low pressure EGR gas recirculating control is being carried out.

As a result, the acid condensed water can be neutralized without wastefully consuming the urea-water.

It should be noted that the condition that the gas passing through the low pressure EGR passage is equal to or larger than the predetermined flow rate threshold is equivalent to a condition that a low pressure EGR rate is equal to or larger than a predetermined low pressure EGR rate threshold. That is, the control section may determine whether or not the gas passing through the low pressure EGR passage is equal to or larger than the predetermined flow rate threshold, or alternatively, may determine whether or not the low pressure EGR rate is equal to or larger than the predetermined low pressure EGR rate threshold, in order to determine whether or not the specific condition is satisfied.

In the second aspect as well, the control section is configured:

so as to include a urea-SCR catalyst bed temperature estimating section which estimates, based on the parameter(s) indicative of the operating state of the engine, a urea-SCR catalyst bed temperature which is a temperature of a bed of the urea-SCR catalyst; and so as to determine that the specific condition is satisfied when a condition that the estimated urea-SCR catalyst bed temperature is equal to or higher than a urea-SCR catalyst bed temperature threshold is further satisfied.

According to the above configuration, the urea-water for producing ammonia supply control is performed when the urea-water can change into the ammonia in the urea-SCR catalyst. Accordingly, wasteful consumption of the urea-water can be avoided.

The second aspect of the present invention apparatus may comprise:

a slip catalyst, which is disposed in the exhaust passage and at a position downstream of a connecting position of the low pressure EGR passage to the exhaust passage, and which purifies ammonia; and an exhaust throttle valve, which is disposed in the exhaust passage and at a position downstream of the connecting position of the low pressure EGR passage to the exhaust passage, and upstream of the slip catalyst, and which varies a passage cross sectional area of the exhaust passage.

The slip catalyst is a catalyst (oxidation catalyst) for purifying ammonia. There may be a case in which ammonia which is not consumed in the urea-SCR catalyst slightly flows out from the urea-SCR catalyst even when the urea-water for reducing nitrogen oxides supply control is being carried out. Generally, the slip catalyst is disposed for purifying such a leaking ammonia during the urea-water for reducing nitrogen oxides supply control.

In the mean time, the second aspect of the present apparatus carries out the urea-water for producing ammonia supply control while the fuel is being supplied to the engine. In this case, the operating state of the engine may become unstable if all of gases discharged from the engine are recirculated to the intake passage through the low pressure EGR passage. In other words, since the opening degree of the exhaust throttle valve can not be changed to the fully closed opening degree, a part of a "gas containing ammonia" flowed out from the urea-SCR catalyst passes through the slip catalyst. Accordingly, it is preferable that the urea-water for producing ammonia supply control be performed when the slip catalyst is in a state in which the slip catalyst can purify ammonia.

In view of the above, it is preferable that the control section be configured:

so as to include a slip catalyst bed temperature estimating section which estimates, based on the parameter(s) indicative of the operating state of the engine, a slip catalyst bed temperature which is a temperature of a bed of the slip catalyst; and so as to determine that the specific condition is satisfied when a condition that the estimated slip catalyst bed temperature is equal to or higher than a slip catalyst bed temperature threshold is further satisfied, and so as to set the opening degree of the exhaust throttle valve to an opening degree other than a fully closed opening degree when the specific condition is satisfied.

According to the configuration described above, it can be avoided that the ammonia produced due to the urea-water for producing ammonia supply control is discharged into the air.

In a third aspect of the present invention apparatus, the control section is configured:

so as to include a generation/occurrence of an engine operation stop request determining section which determines whether or not an engine operation stop request to stop an engine operation occurs (is generated);

so as to stop supplying the fuel from the fuel supply section when the engine operation stop request occurs; and so as to determine that the specific condition is satisfied when a condition that the estimated amount of the acid condensed water is equal to or larger than the acid condensed water amount threshold in a case in which the engine operation stop request has occurred.

Further, the third aspect comprises a motor driving section which forcibly rotates the engine with an external power from a point in time at which the specific condition is satisfied to a point in time at which the estimated amount of the acid condensed water becomes smaller than a motor driving stop threshold.

According to the third aspect, the fuel supply is stopped when the engine operation stop request has occurred. Further, if the condition that the estimated amount of the acid condensed water is equal to or larger than the acid condensed water amount threshold when the engine operation stop request has occurred, it is determined that the specific condition is satisfied, so that the engine is rotated by the motor driving section and the urea-water for producing ammonia supply control is carried out. As a result, the "gas containing ammonia" flowed out from the urea-SCR catalyst is recirculated into the intake passage through the low pressure EGR passage. Consequently, the acid condensed water can be neutralized after the generation/occurrence of the engine operation stop request.

In a modification of the third aspect of the present invention apparatus, the control section is configured:

so as to include a generation of an engine operation stop request determining section which determines whether or not an engine operation stop request to stop an engine operation occurs; and so as to determine that the specific condition is satisfied when a condition that the estimated amount of the acid condensed water is equal to or larger than the acid condensed water amount threshold in a case in which the engine operation stop request has occurred.

Further, the control section of the modification of the third aspect is configured so as to continue to operate the engine by continuing to supply the fuel to the engine from the fuel supply section from a point in time at which the specific condition becomes satisfied to a point in time at which the estimated amount of the acid condensed water becomes smaller than an engine stop threshold.

According to the modification of the third aspect, if the condition that the estimated amount of the acid condensed water is equal to or larger than the acid condensed water amount threshold when the engine operation stop request has occurred, it is determined that the specific condition is satisfied. Then, the engine is continued to be operated and the urea-water for producing ammonia supply control is carried out, from the point in time at which the specific condition becomes satisfied to the point in time at which the estimated amount of the acid condensed water becomes smaller than the engine stop threshold. As a result, the "gas containing ammonia" flowed out from the urea-SCR catalyst is recirculated into the intake passage through the low pressure EGR passage. Consequently, the acid condensed water can be neutralized after the generation/occurrence of the engine operation stop request.

It should be noted that the control section of this aspect preferably, from the point in time at which the specific condition becomes satisfied to the point in time at which the estimated amount of the acid condensed water becomes smaller than the engine stop threshold, continues to supply the fuel so as to have the engine operate in an idling state; has an appropriate amount of the low pressure EGR gas pass through a bypass passage if a low pressure EGR cooler disposed in the low pressure EGR passage has the bypass passage; and has an appropriate amount of the gas pass through a bypass passage if an intercooler disposed in the intake passage has the bypass passage. According to this configuration, since an excessive amount of the low pressure EGR gas is not introduced into the engine, the idling can stably be continued.

In the third aspect and its modification, the control section is configured:

so as to include a urea-SCR catalyst bed temperature estimating section which estimates, based on the parameter indicative of the operating state of the engine, a urea-SCR catalyst bed temperature which is a temperature of a bed of the urea-SCR catalyst; and so as to determine that the specific condition is satisfied when a condition that the estimated urea-SCR catalyst bed temperature is equal to or higher than a urea-SCR catalyst bed temperature threshold is further satisfied.

According to the above configuration, the urea-water for producing ammonia supply control is performed when the urea-water changes into the ammonia in the urea-SCR catalyst. Accordingly, wasteful consumption of the urea-water can be avoided.

Meanwhile, when the urea-water for producing ammonia supply control is performed, the ammonia is supplied to the low pressure EGR passage and the intake passage. Thus, after the urea-water for producing ammonia supply control, if the engine operation is stopped before a point in time at which, after the low pressure EGR passage is scavenged by a gas which does not substantially contain ammonia, the intake passage is scavenged by "an new air and the gas from the low pressure EGR passage", ammonia remains in the intake passage. At this time, if members for the low pressure EGR system or for the intake system are removed for a repair or a checkup, the ammonia is released into the air.

In view of the above, in a fourth aspect of the present invention apparatus, the control section comprises:

a generation of an engine operation stop request determining section which determines whether or not an engine operation stop request to stop an engine operation is generated; and an ammonia remaining determining section which determines whether or not ammonia produced by the urea-water for producing ammonia supply control is remaining in the intake passage when the engine operation stop request to stop the engine operation is generated.

In addition, the control section is configured so as to perform, for a predetermined time, an ammonia eliminating control to have the fuel supply section continue to supply the fuel to the engine so that the engine continues to be operated in a state in which the urea-water is not supplied from the urea-water supply section, when it is determined by the ammonia remaining determining section that the ammonia produced is remaining in the intake passage.

This can allow the engine to stop when no or little ammonia remains in the low pressure EGR passage and the intake passage. Accordingly, it can be avoided that a considerably large amount of the ammonia is released into the air for the repair, the checkup, or the like.

In this case, the control section comprises a scavenging state estimating section.

The scavenging state estimating section
(1) estimates a first gas amount which is an integrated amount of a gas passing through the low pressure EGR passage after a stop of an execution of the urea-water for producing ammonia supply control;
(2) determines whether or not the estimated first gas amount becomes equal to or larger than a volume of the low pressure EGR passage; and
(3) estimates a second gas amount which is an integrated amount of a gas passing through the intake passage after a point in time at which the estimated first gas amount becomes equal to or larger than the volume of the low pressure EGR passage.

Further, the ammonia remaining determining section is configured so as to determine that the ammonia is remaining in the intake passage in a case in which the second gas amount is neither equal nor larger than a volume of the intake passage when the engine operation stop request occurs (is generated).

According to the above configuration, it is possible to readily determine whether or not the ammonia is remaining in the low pressure EGR passage and the intake passage.

Further, in this case, the control section is configured so as to stop/terminate the ammonia eliminating control to stop the engine operation, when the estimated second gas amount becomes equal to or larger than the volume of the intake passage.

According to the configuration above, it can be avoided that the engine is wastefully continued to be operated, and that the ammonia produced due to the urea-water for producing ammonia supply control is discharged into the air.

Other objects, features, and advantages of the present invention apparatus will be readily understood from the following description of each of embodiments of the present invention apparatus with reference to the accompanying drawings.

DESCRIPTION OF THE EMBODIMENT

Each of embodiments of a control apparatus for an internal combustion engine according to the present invention will next be described with reference to the drawings.

First Embodiment

Construction

Figure 1:
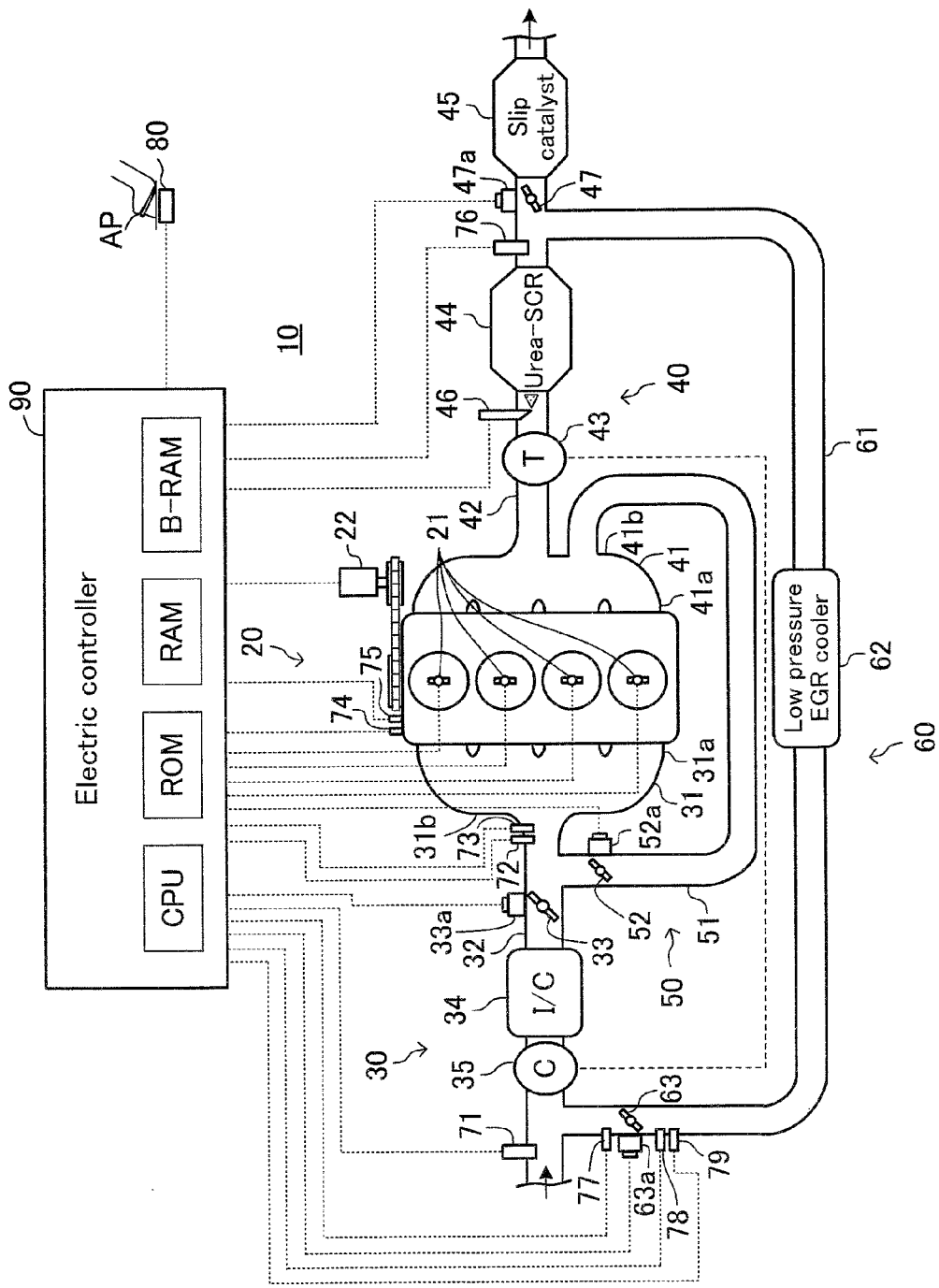
FIG. 1 is a schematic diagram of an internal combustion engine to which a control apparatus (first control apparatus) for an internal combustion engine according to a first embodiment of the present invention is applied.

FIG. 1 shows a schematic configuration of an internal combustion engine 10 to which a control apparatus (hereinafter, simply referred to as a "first control apparatus") according to a first embodiment of the present invention is applied. The engine 10 is an in-line four cylinder diesel engine. The engine 10 comprises an engine main body 20, an intake system 30, an exhaust system 40, a high pressure EGR system 50, and a low pressure EGR system 60. Further, the first control apparatus includes an electric controller 90.

The engine main body 20 comprises a crank case section, a cylinder block section, and a cylinder head section. The engine main body 20 has a plurality of (four of) combustion chambers (cylinders), each of which is defined by a head surface of a piston, a cylinder wall surface, and a lower surface of the cylinder head section. Each of fuel injectors 21 is disposed at the top of each of the combustion chambers. A "high pressure fuel" is supplied to each of the fuel injectors 21 from an "unillustrated pump for fuel injection communicating with an unillustrated fuel tank." Each of the fuel injectors 21 is opened in response to an instruction signal from the electric controller 90 to thereby inject the high pressure fuel into each of the combustion chambers.

A motor driving device (in the present example, starter) 22 which rotates the engine with an external power is fixed to the engine main body 20. That is, the motor driving device 22 is configured so as to forcibly rotate the engine 10 in response to an instruction signal (drive signal), using an electrical power from an "unillustrated battery" of an "unillustrated vehicle on which the engine 10 is mounted."

The intake system 30 includes an intake manifold 31, an intake pipe 32, a high pressure throttle valve 33, an intercooler 34, and a compressor 35 of a supercharger.

The intake manifold 31 includes a plurality of branch portions 31a and a merged portion 31b into which a plurality of the branch portions 31a merge. Each of a plurality of the branch portions 31a is connected to each of a plurality of the combustion chambers through/via each of intake ports.

The intake pipe 32 is connected to the merged portion 31b of the intake manifold 31.

The intake manifold 31, the intake pipe 32, and the like constitute an intake passage.

The high pressure throttle valve 33 is disposed at a predetermined position in the intake pipe 32. The high pressure throttle valve 33 is rotatably supported by the intake pipe 32. The high pressure throttle valve 33 is configured so as to vary a passage cross sectional area of the intake passage formed by the intake pipe 32, by being rotated. A high pressure throttle valve actuator 33a is configured so at to rotate the high pressure throttle valve 33 in response to an instruction signal (drive signal).

The intercooler 34 is disposed at a position upstream of the high pressure throttle valve 33 in the intake pipe 32. The intercooler 34 is configured so as to cool down a gas passing through the intake pipe 32.

The compressor 35 is disposed at a position upstream of the intercooler 34 in the intake pipe 32. The compressor 35 is configured so as to rotate together with a turbine 43 described later to thereby compress the gas passing through the intake pipe 32.

The exhaust system 40 includes an exhaust manifold 41, an exhaust pipe 42, the turbine 43 of the supercharger, a urea-SCR catalyst 44, a slip catalyst 45, a urea-water supply valve (urea-water supply section) 46, and a exhaust throttle valve 47.

The exhaust manifold 41 comprises a plurality of branch portions 41a and a merged portion 41b into which a plurality of the branch portions 41a merge. Each of a plurality of the branch portions 41a is connected to each of a plurality of the combustion chambers through/via each of exhaust ports.

The exhaust pipe 42 is connected to the merged portion 41b of the exhaust manifold 41.

The exhaust manifold 41, the exhaust pipe 42, and the like constitute an exhaust passage.

The turbine 43 is disposed at a predetermined position in the exhaust pipe 42. The turbine 43 is configured so as to be rotated by a high-temperature and high-pressure exhaust gas to thereby rotate the compressor 35.

The urea-SCR catalyst 44 is disposed at a "position downstream of the turbine 43" in the exhaust pipe 42 (exhaust passage). As described later, a urea-water is supplied to the urea-SCR catalyst 44. When a bed temperature of the urea-SCR catalyst 44 is equal to or higher than a urea-SCR catalyst bed temperature threshold, the urea-water is converted into ammonia ($NH_3$) and carbon dioxides by hydrolysis in the urea-SCR catalyst 44, as shown in formula (1).

$$(NH_2)_2CO + H_2O \rightarrow 2NH_3 + CO_2 \quad (1)$$

When the bed temperature of the urea-SCR catalyst 44 is equal to or higher than the urea-SCR catalyst bed temperature threshold, the urea-SCR catalyst 44 reduces nitrogen oxides (NOx) with/using the ammonia ($NH_3$) produced from the urea-water to thereby purify the nitrogen oxides. In the present example, the urea-SCR catalyst 44 includes a support made of ceramics, and zeolitic series catalyst supported on the support. The urea-SCR catalyst 44 may be a vanadium series catalyst.

More specifically, chemical reactions shown by formulas of (2)-(4) described below occur in the urea-SCR catalyst 44, so that the nitrogen oxides are reduced/purified.

$$4NO + 4NH_3 + O_2 \rightarrow 4N_2 + 6H_2O \quad (2)$$

$$6NO_2 + 8NH_3 \rightarrow 7N_2 + 12H_2O \quad (3)$$

$$NO + NO_2 + 2NH_3 \rightarrow 2N_2 + 3H_2O \quad (4)$$

The slip catalyst 45 is disposed at a "position downstream of the urea-SCR catalyst 44" in the exhaust pipe 42 (exhaust passage). The slip catalyst 45 is an oxidation catalyst, which purifies ammonia when a bed temperature of the slip catalyst 45 is equal to or higher than a slip catalyst bed temperature threshold.

The urea-water supply valve 46 is disposed at a "position upstream of the urea-SCR catalyst 44 and downstream of the turbine 43" in the exhaust pipe 42 (exhaust passage). The urea-water supply valve 46 is connected with an unillustrated urea-water tank, a urea-water pressurizing device, and so on. The urea-water supply valve 46 constitutes a urea-water supply section which supplies the urea-water to the urea-SCR catalyst 44 in response to an instruction.

The exhaust throttle valve 47 is disposed at a position "downstream of the urea-SCR catalyst 44 and upstream of the slip catalyst 45" in the exhaust pipe 42 (exhaust passage). The exhaust throttle valve 47 is configured so as to vary a passage cross sectional area of the exhaust passage formed by the exhaust pipe 42 as its opening degree is changed. The exhaust throttle valve actuator 47a is configured so at to change the opening degree of the exhaust throttle valve 47 in response to an instruction.

The high pressure EGR system 50 includes a high pressure EGR pipe 51 and a high pressure EGR valve 52.

One of ends of the high pressure EGR pipe 51 is connected to the merged portion 41b of the exhaust manifold 41 (that is, a position upstream of the turbine 43 in the exhaust passage). The other of the ends of the high pressure EGR pipe 51 is connected to a "position downstream of the high pressure throttle valve 33" in the intake pipe 32 (intake passage). Thus, the high pressure EGR pipe 51 forms a high pressure EGR passage communicating between the position upstream of the turbine 43 in the exhaust passage and the position downstream of the compressor 35 in the intake passage.

The high pressure EGR valve 52 is disposed in the high pressure EGR pipe 51. The high pressure EGR valve 52 is configured so as to vary a passage cross sectional area of the high pressure EGR passage formed by the high pressure EGR pipe 51 as its opening degree is changed. The high pressure EGR valve actuator 52a is configured so at to change the opening degree of the high pressure EGR valve 52 in response to an instruction. When the high pressure EGR valve 52 is fully closed (in a fully closed state), the passage cross sectional area of the high pressure EGR passage becomes "0."

The low pressure EGR system 60 includes a low pressure EGR pipe 61, a low pressure EGR cooler 62, and a low pressure EGR valve 63.

One of ends of the low pressure EGR pipe 61 is connected to a "position downstream of the urea-SCR catalyst 44 and upstream of the exhaust throttle valve 47" in the exhaust pipe 42 (exhaust passage). The other of the ends of the low pressure EGR pipe 61 is connected to a "position upstream of the compressor 35" in the intake pipe 32 (intake passage). Thus, the low pressure EGR pipe 51 forms a low pressure EGR passage communicating between the position downstream of the urea-SCR catalyst 44 in the exhaust passage and the intake passage (position upstream of the compressor 35 in the intake passage).

The low pressure EGR cooler 62 is disposed in the low pressure EGR pipe 61. The low pressure EGR cooler 62 is configured so as to cool down a gas passing through the low pressure EGR pipe 61.

The low pressure EGR valve 63 is disposed at a "position downstream of the low pressure EGR cooler 62 with respect to a flow of a gas flowing in the low pressure EGR pipe 61" in the low pressure EGR pipe 61. The low pressure EGR valve 63 is configured so as to vary a passage cross sectional area of the low pressure EGR passage formed by the low pressure EGR pipe 61 as its opening degree is changed. The low pressure EGR valve actuator 63a is configured so at to change the opening degree of the low pressure EGR valve 63 in response to an instruction. When the low pressure EGR valve 63 is fully closed (in a fully closed state), the passage cross sectional area of the low pressure EGR passage becomes "0."

Further, the first control apparatus comprises an air flow-meter (fresh air flow rate sensor) 71, an intake pressure sensor (supercharging pressure sensor) 72, an intake air temperature sensor 73, a cooling water temperature sensor 74, an engine rotational speed sensor 75, a NOx sensor 76, a low pressure EGR valve downstream pressure sensor 77, a low pressure EGR valve upstream pressure sensor 78, a low pressure EGR gas temperature sensor 79, and an accelerator pedal operation amount sensor 80.

The air flowmeter 71 is disposed in the intake pipe 32 (intake passage). The air flowmeter 71 outputs a signal Ga indicative of (representing) a "fresh air flow rate", which is a mass flow rate (air amount per unit time) of the air (fresh air) passing through the intake passage.

The intake pressure sensor 72 detects a pressure of a gas at the position downstream of the high pressure throttle valve 33 in the intake pipe 32 so as to output a signal P indicative of a supercharging pressure.

The intake air temperature sensor 73 detects a temperature (intake air temperature) of a gas at a position downstream of the high pressure throttle valve 33 in the intake pipe 32 so as to output a signal THA indicative of the intake air temperature.

The cooling water temperature sensor 74 detects a temperature (cooling water temperature) of a cooling water of the engine 10 so as to output a signal THW indicative of the cooling water temperature.

The engine rotational speed sensor 75 detects a rotational speed of the engine 10 so as to output a signal indicative of an engine rotational speed NE.

The NOx sensor 76 is disposed at a "position downstream of the urea-SCR catalyst 44 and upstream of a connecting portion between the low pressure EGR pipe 61 and the exhaust pipe 42" in the exhaust pipe 42 (exhaust passage). The NOx sensor 76 is a so-called NOx sensor of a limiting current type (refer to, for example, Japanese Patent Application Laid-Open (kokai) Nos. 2010-71195, 2009-46992, and 2003-120399). The NOx sensor 76 is configured so as to output value DNOx which corresponds to a "summed (total) concentration of a NOx concentration and an ammonia concentration" of a gas reaching the NOx sensor 76.

More specifically, NOx (mainly NO) is split into $N_2$ and $O_2$ in the NOx sensor 76, and the NOx sensor 76 outputs the output value DNOx which is proportional to a concentration of the split $O_2$, according to a principle similar to an oxygen concentration sensor of a limiting current type. Further, in the NOx sensor 76, $NH_3$ (ammonia) is broken down to NO and $H_2O$, and furthermore, the NO is split into $N_2$ and $O_2$. The NOx sensor 76 outputs the output value DNOx which is proportional to a concentration of the $O_2$, according to the principle similar to the oxygen concentration sensor of a limiting current type.

Accordingly, when the gas reaching the NOx sensor 76 contains NOx but does not contain ammonia, the output value DNOx varies in proportion to a concentration of the NOx. When the gas reaching the NOx sensor 76 contains ammonia but does not contain NOx, the output value DNOx varies in proportion to a concentration of the ammonia.

The low pressure EGR valve downstream pressure sensor 77 detects a pressure (low pressure EGR valve downstream pressure) of a gas at a "position downstream of the low pressure EGR valve 63" in the low pressure EGR pipe 61, and generate a signal Pd indicative of the low pressure EGR valve downstream pressure.

The low pressure EGR valve upstream pressure sensor 78 detects a pressure (low pressure EGR valve upstream pressure) of a gas at a "position upstream of the low pressure EGR valve 63" in the low pressure EGR pipe 61, and generate a signal Pu indicative of the low pressure EGR valve upstream pressure.

The low pressure EGR gas temperature sensor 79 detects a temperature (low pressure EGR valve upstream temperature) of a gas at the "position upstream of the low pressure EGR valve 63" in the low pressure EGR pipe 61, and generate a signal Tu indicative of the low pressure EGR valve upstream temperature.

The accelerator pedal operation amount sensor 80 detects an operation amount of an accelerator pedal AP so as to output a signal Accp indicative of the operation amount of the accelerator pedal AP.

The electric controller 90 is a well-known microcomputer, which includes "a CPU, a ROM, a RAM, a Back-up RAM which stores data while power is supplied and which retains the stored data even while power is not supplied, an interface including an AD converter, and so on".

The interface of the electric controller 90 is connected to the sensors 71 to 80 and supplies signals from the sensors 71-80 to the CPU. Further, the interface is configured so as to send instructions (instruction signals, drive signals) to each of the injection valves 21, the high pressure throttle valve actuator 33a, the urea-water supply valve 46, the exhaust throttle actuator 47a, the high pressure EGR valve actuator 52a, the low pressure EGR valve actuator 63a, and so on, in response to the instructions from the CPU.

(Outline of Operation)

Next will be described an outline of the operation of the first control apparatus configured as described above. The CPU of the first control apparatus determines a fuel injection amount based on the signal Accp indicative of the accelerator operation amount and the engine rotational speed NE, and sends an instruction signal to each of the fuel injection valves 21 in such a manner that the fuel of the determined fuel injection amount is injected (supplied) into each of the combustion chambers. It should be noted that the CPU stops the fuel injection (stop supplying the fuel) when it is determined that an operating state of the engine 10 is in a decelerating operating state, based on engine operating parameters (e.g., operation amount of the accelerator pedal Accp, and the engine rotational speed NE) indicative of the operating state of the engine 10.

The CPU determines a target high pressure EGR rate based on the engine operating parameters (e.g., the fuel injection amount Q, and the engine rotational speed NE) in a normal/ordinal operating state, and sends the instruction signal to the high pressure EGR valve actuator 52a in such a manner that an actual high pressure EGR rate coincides with the target high pressure EGR rate.

The CPU determines a target low pressure EGR rate based on the engine operating parameters (e.g., the fuel injection amount Q, and the engine rotational speed NE) in the normal/ordinal operating state, and sends the instruction signal to the low pressure EGR valve actuator 63a in such a manner that an actual low pressure EGR rate coincides with the target low pressure EGR rate.

The CPU determines a target exhaust throttle valve opening degree based on the engine operating parameters (e.g., the fuel injection amount Q, and the engine rotational speed NE) in the normal/ordinal operating state, and sends the instruction signal to the exhaust throttle valve actuator 47a in such a manner that an actual exhaust throttle valve opening degree coincides with the target exhaust throttle valve opening degree.

The CPU determines, based on the engine operating parameters (e.g., the fuel injection amount Q, and the engine rotational speed NE), an "amount of the urea-water to be supplied to the urea-SCR catalyst 44" which is necessary and sufficient for reducing NOx contained in the exhaust gas, and send the instruction signal to the urea-water supply valve 46 in such a manner that the urea-water of the determined amount is supplied to the urea-SCR catalyst 44. This control is referred to as a "urea-water for reducing nitrogen oxides supply control." In this case, the amount of the urea-water supplied from the urea-water supply valve 46 may be feedback-controlled in such a manner that the amount of the supplied/added urea-water becomes appropriate based on the output value DNOx of the NOx sensor 76 (that is, in such a manner that the output value DNOx is equal to "0", and thus, neither NOx nor ammonia flows out from the urea-SCR catalyst 44).

Meanwhile, the gas passing through the low pressure EGR passage contains water vapor, and sulfur oxide SOx produced due to "sulfur S contained in the fuel and/or the lubrication oil." Accordingly, when the water vapor contained in the gas passing through the low pressure EGR passage is cooled down when passing through the low pressure EGR cooler 62, the intercooler 34, and the like, condensed water is produced. The condensed water becomes acid condensed water because of the sulfur oxide SOx. The acid condensed water is accumulated in the low pressure EGR passage and the intake passage. The CPU estimates an amount of the acid condensed water (acid condensed water amount) as described later. Further, the CPU estimates a bed temperature (urea-SCR catalyst bed temperature) of the urea-SCR catalyst 44 based on the engine operating parameters (e.g., the fuel injection amount Q and the engine rotational speed NE), as described later.

In addition, the CPU determines (monitors) whether or not a specific condition (start condition for execution of a urea-water for producing ammonia supply control) described later is satisfied. This specific condition become satisfied when all of conditions described below are satisfied, and becomes unsatisfied when at least one of the conditions described below is unsatisfied.

(Condition 1-1) The operating state of the engine 10 is a "decelerating operating state in which the fuel injection is stopped (decelerating fuel supply (injection) terminating operating state)."

(Condition 1-2) The urea-SCR catalyst bed temperature is equal to or higher than the urea-SCR catalyst bed temperature threshold.

(Condition 1-3) The estimated acid condensed water amount is equal to or larger than an acid condensed water amount threshold (threshold for starting the urea-water for producing ammonia supply control). It should be noted that each of the Conditions 1-3 is a prerequisite condition for the specific condition to be satisfied.

When the specific condition is satisfied, the CPU supplies a predetermined amount of the urea-water to the urea-SCR catalyst 44 from the urea-water supply valve 46. In this case, since the fuel injection is stopped, no NOx is discharged from the engine 10. Therefore, an amount of the urea-water which should be supplied to the urea-SCR catalyst 44 for the "urea-water for reducing nitrogen oxides supply control" is equal to "0", and thus, the amount of the urea-water supplied to the urea-SCR catalyst 44 at this point in time is larger than an "amount required for the urea-water for reducing nitrogen oxides supply control." At this point in time, it is preferable that the amount of the supplied urea-water become larger as the estimated urea-SCR catalyst bed temperature becomes higher. This is because, a larger amount of the urea-water is hydrolyzed, and thus, a larger amount of ammonia is produced, as the urea-SCR catalyst bed temperature is higher. Such a "control to supply the urea-water to have ammonia flow out from the urea-SCR catalyst 44" is referred to as a "urea-water for producing ammonia supply control."

Further, when the specific condition is satisfied, the CPU controls the low pressure EGR valve 63 so as to set the low pressure EGR valve opening degree to a "predetermined opening degree (opening degree in the opening side equal to or smaller than a fully opened opening degree and larger than a fully closed opening degree) larger than an opening degree of the low pressure EGR valve 63 immediately before the specific condition becomes satisfied"; controls the high pressure EGR valve 52 so as to set the high pressure EGR valve opening degree to a "predetermined opening degree (opening degree in the closing side equal to or larger than a fully closed opening degree and smaller than a fully opened opening degree) smaller than an opening degree of the high pressure EGR valve 52 immediately before the specific condition becomes satisfied"; and controls the exhaust throttle valve 47 so as to set the exhaust throttle valve opening degree to a "predetermined opening degree (opening degree in the closing side equal to or larger than a fully closed opening degree and smaller than a fully opened opening degree) smaller than an opening degree of the exhaust throttle valve 47 immediately before the specific condition becomes satisfied." It should be noted that, in the present invention, controlling a "control valve such as the low pressure EGR valve 63, the high pressure EGR valve 52, and the exhaust throttle valve 47" to a fully opened state is equivalent to setting the opening degree of the control valve to the maximum opening degree of that control valve. Similarly, controlling the control valve to a fully closed state is equivalent to setting the opening degree of the control valve to the minimum opening degree ("0") of that control valve. Accordingly, when the opening degree of the control valve is an opening degree in the closing side, the opening degree of the control valve is equal to or smaller than a predetermined opening degree so that a passage cross sectional area of a passage in which the control valve is disposed is set to an area smaller than a predetermined area. Similarly, when the opening degree of the control valve is an opening degree in the opening side, the opening degree of the control valve is equal to or larger than a predetermined opening degree so that a passage cross sectional area of a passage in which the control valve is disposed is set to an area larger than a predetermined area.

Accordingly, the urea-water is supplied to the urea-SCR catalyst 44, and ammonia is produced from the urea-water. At this point in time, since NOx is not flowed into the urea-SCR catalyst 44, the produced ammonia flows out from the urea-SCR catalyst 44 without being consumed in the urea-SCR catalyst 44. In addition, a large part of the gas flowing out from the urea-SCR catalyst 44 (gas containing the produced ammonia) passes through the low pressure EGR passage. Accordingly, the acid condensed water remaining in the members forming the low pressure EGR passage (i.e., the low pressure EGR pipe 61, the low pressure EGR cooler 62, the low pressure EGR valve 63, and the like) is neutralized by the ammonia. Further, the acid condensed water remaining in the members forming the intake passage (i.e., the intake pipe 32, the compressor 33, the intercooler 34, the high pressure throttle valve 35, the intake manifold 31, and the like) is neutralized by the ammonia.

When the estimated amount of the acid condensed water becomes equal to or smaller than a threshold for terminating the urea-water for producing ammonia supply control (which is a value smaller by a predetermined amount than the threshold for starting the urea-water for producing ammonia supply control, and may be "0") owing to a continuation of such a state, the CPU terminates/ends supplying the urea-water to the urea-SCR catalyst 44. With the above described control, it can be avoided that the state where a large amount of the acid condensed water remains in the EGR passage and the intake passage continues, and thus, the possibility of corrosion of the engine members caused by the acid condensed water can be reduced.

(Actual Operation)

Next will be described an actual operation of the first control apparatus.

<Execution of the Control>

Figure 2:
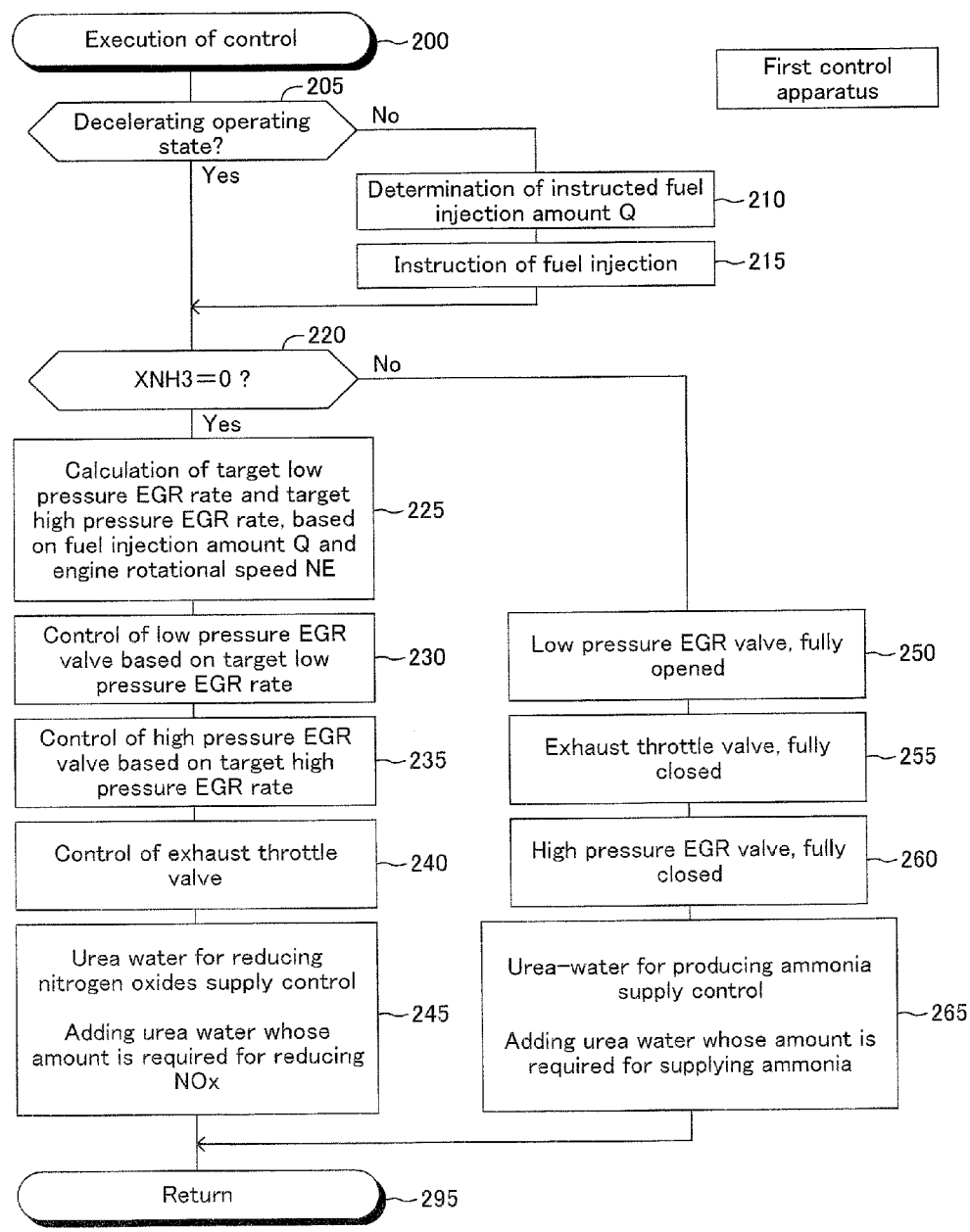
FIG. 2 is a flowchart showing a program executed by a CPU of the first control apparatus.

The CPU of the electric controller 90 is configured so as to repeatedly execute a "execution of the control routine" shown in FIG. 2 every elapse of a predetermined time. Accordingly, at a predetermined point in time, the CPU starts processing from step 200 of FIG. 2, and determines whether or not the engine 10 is in the decelerating operating state at step 205. More specifically, the CPU determines that the engine 10 is in the decelerating operating state, when the operation amount of the accelerator pedal Accp is "0", and the engine rotational speed NE is equal to or higher than an engine rotational speed threshold NEth.

When the CPU determines that the engine 10 is not in the decelerating operating state, the CPU makes a "No" determination at step 205 to proceed to step 210, at which the CPU determines an instructed fuel injection amount Q based on the operation amount Accp of the accelerator pedal and the engine rotational speed NE. It should be noted that the CPU may correct the instructed fuel injection amount Q in view of a smoke generation amount, or the like. Subsequently, the CPU proceeds to step 215 to send an fuel injection instruction signal to the fuel injection valve 21 of a fuel injection cylinder in such a manner that the fuel of an amount corresponding to the determined instructed fuel injection amount Q is injected from the fuel injection valve 21. The fuel injection cylinder refers to a cylinder in which combustion should be started at the present point in time. Thereafter, the CPU proceeds to step 220.

In contrast, if the CPU determines that the engine 10 is in the decelerating operating state when the CPU executes the process of step 205, the CPU makes a "Yes" determination at step 205 to directly proceed to step 220. Accordingly, since the process of step 215 is not executed, the fuel injection is not carried out (fuel supply is stopped) when the engine 10 is in the decelerating operating state.

At step 220, the CPU determines whether or not a value of a urea-water for producing ammonia supply control flag XNH3 (hereinafter, simply referred to as a "supply control flag XNH3") is "0." The value of the supply control flag XNH3 is set to "0" in an initial routine executed when an unillustrated ignition key switch of an unillustrated vehicle on which the engine 10 is mounted is changed from off-position to on-position. Further, the value of the supply control flag XNH3 is set to "1" by means of a "routine for determination of a start of urea-water for producing ammonia supply control" shown in FIG. 3 described later, when the specific condition becomes satisfied.

It is assumed here that the value of the supply control flag XNH3 is "0." In this case, the CPU makes a "Yes" determination at step 220 to sequentially execute processes from step 225 to step 245, and then proceeds to step 295 to end the present routine tentatively.

Step 225: The CPU calculates the target low pressure EGR rate and the target high pressure EGR rate, based on the fuel injection amount Q and the engine rotational speed NE.

Step 230: The CPU sends the instruction signal to the low pressure EGR valve actuator 63a so that an actual low pressure EGR rate coincides with the target low pressure EGR rate, to control the opening degree of the low pressure EGR valve 63.

It should be noted that the CPU calculates an actual low pressure EGR rate γLP by dividing an actual low pressure EGR gas flow rate (flow rate of a gas flowing through the low pressure EGR pipe 61) by an entire gas flow rate (total flow rate of gases flowing into the engine 10). Further, the CPU may feedback-control the opening degree of the low pressure EGR valve 63 in such a manner that the actual low pressure EGR rate γLP coincides with the target low pressure EGR rate.

In this case, the CPU obtains the actual low pressure EGR gas flow rate (low pressure EGR passage passing gas amount GLPEGR) based on the followings.

The low pressure EGR valve downstream pressure Pd detected by the low pressure EGR valve downstream pressure sensor 77.

The low pressure EGR valve upstream pressure Pu detected by the low pressure EGR valve upstream pressure sensor 78.

The low pressure EGR gas upstream temperature Tu detected by the low pressure EGR gas temperature sensor 79.

The opening degree of the low pressure EGR valve 63 (instruction signal sent to the low pressure EGR valve actuator 63a).

A model formula which represents a behavior of a liquid when the liquid passes through a throttle.

Further, the CPU obtains the entire gas flow rate based on the supercharging pressure P detected by the intake pressure sensor 72, the intake air temperature THA detected by the intake air temperature sensor 73, and the engine rotational speed NE.

Step 235: The CPU sends the instruction signal to the high pressure EGR valve actuator 52a so that an actual high pressure EGR rate coincides with the target high pressure EGR rate, to control the opening degree of the high pressure EGR valve 52. The CPU may feedback-control the opening degree of the high pressure EGR valve 52 in a similar way to the feedback-control of the low pressure EGR valve 63.

Step 240: The CPU determines, based on the engine operating parameters (e.g., the fuel injection amount Q and the engine rotational speed NE), a target exhaust throttle valve opening degree, and sends the instruction signal to the exhaust throttle valve actuator 47a so that the actual opening degree of the exhaust throttle valve 47 coincides with the target exhaust throttle valve opening degree in order to control the opening degree of the exhaust throttle valve 47. It should be noted that the CPU sets the opening degree of the exhaust throttle valve 47 to an opening degree in the opening side larger than "0" (opening degree other than the fully closed opening degree) during the normal operation (when the specific condition is not satisfied).

Step 245: The CPU determines, based on the engine operating parameters (e.g., the fuel injection amount Q and the engine rotational speed NE), an "amount of the urea-water, which is estimated to be necessary and sufficient for producing ammonia in the urea-SCR catalyst 44", an amount of the ammonia being required for purifying (reducing) NOx contained in the exhaust gas in the urea-SCR catalyst 44", and supplies the amount of the urea-water from the urea-water supply valve 46. That is, the CPU performs the urea-water for reducing nitrogen oxides supply control. At this point in time, the CPU may feedback-control the amount of the urea-water supplied from the urea-water supply valve 46 in such a manner that the output value DNOx of the NOx sensor 76 coincides with "0" (in other words, in such a manner that neither NOx nor ammonia flows out form the urea-SCR catalyst 44).

In contrast, if the value of the supply control flag XNH3 is "1" when the CPU executes the process of step 220, the CPU makes a "No" determination at step 220 to sequentially executes processes from step 250 to step 265, and thereafter, proceeds to step 295 to end the present routine tentatively.

Step 250: The CPU sends the instruction signal to the low pressure EGR valve actuator 63a in such a manner that the opening degree of the low pressure EGR valve 63 becomes a "predetermined opening degree (opening degree in the opening side, and in the present example, the fully opened state) larger than the opening degree immediately before the value of the supply control flag XNH3 changed from "0" to "1" (the opening degree immediately before the specific condition became satisfied).

Step 255: The CPU sends the instruction signal to the exhaust throttle valve actuator 47a in such a manner that the opening degree of the exhaust throttle valve 47 becomes a "predetermined opening degree (opening degree in the closing side, and in the present example, the fully closed state) smaller than the opening degree immediately before the value of the supply control flag XNH3 changed from "0" to "1" (the opening degree immediately before the specific condition became satisfied).

Step 260: The CPU sends the instruction signal to the high pressure EGR valve actuator 52a in such a manner that the opening degree of the high pressure EGR valve 52 becomes a "predetermined opening degree (opening degree in the closing side, and in the present example, the fully closed state) smaller than the opening degree immediately before the value of the supply control flag XNH3 changed from "0" to "1" (the opening degree immediately before the specific condition became satisfied).

Step 265: The CPU supplies a predetermined amount of the urea-water from the urea-water supply valve 46. That is, the CPU performs the urea-water for producing ammonia supply control. At this point in time, the CPU may vary the predetermined amount in such a manner that the predetermined amount becomes larger as the urea-SCR catalyst bed temperature separately estimated in a routine described later becomes higher.

<Urea-Water for Producing Ammonia Supply Control•Start Determination>

Figure 3:
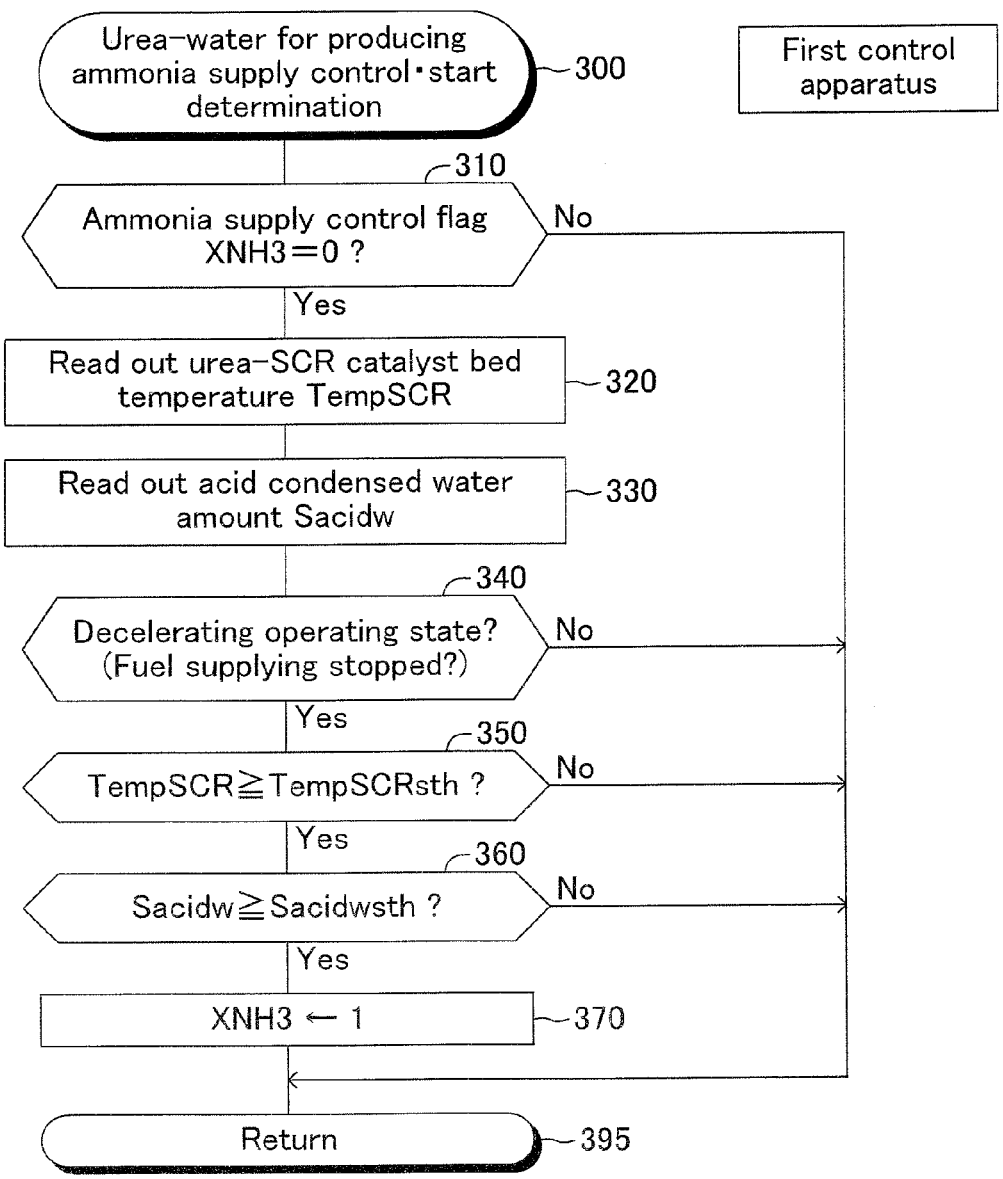
FIG. 3 is a flowchart showing a program executed by the CPU of the first control apparatus.

The CPU is configured so as to repeatedly execute a "routine of start determination for the urea-water for producing ammonia supply control" shown by a flowchart in FIG. 3 every elapse of a predetermined time. Accordingly, at a predetermined point in time, the CPU starts processing from step 300 of FIG. 3 to proceed to step 310, at which the CPU determines whether or not the value of the supply control flag XNH3 is "0."

It is assumed here that the value of the supply control flag XNH3 is "0." In this case, the CPU makes a "Yes" determination at step 310 to proceed to step 320, at which the CPU reads out the urea-SCR catalyst bed temperature TempSCR which is separately estimated in a routine described later. Subsequently, the CPU reads out the acid condensed water amount Sacidw which is separately estimated in a routine described later, at step 330.

Subsequently, at step 340, the CPU determines whether or not the operating state of the engine 10 is the "decelerating operating state in which the fuel injection is stopped (decelerating fuel injection terminating operating state), (that is, it determines whether or not the above described condition 1-1 is satisfied). It should be noted that the CPU determines whether or not the operation amount Accp of the accelerator pedal is "0" and the engine rotational speed NE is equal to or higher than the engine rotational speed threshold NEth. At this point in time, if the operating state of the engine 10 is not the "decelerating operating state in which the fuel injection is stopped", the CPU makes a "No" determination at step 340 to directly proceed to step 395, at which the CPU ends the present routine tentatively. Consequently, the value of the supply control flag XNH3 is maintained at "0."

In contrast, when the operating state of the engine 10 is the "decelerating operating state in which the fuel injection is stopped", the CPU makes a "Yes" determination at step 340 to proceed to step 350, at which the CPU determines whether or not the urea-SCR catalyst bed temperature TempSCR is equal to or higher than the urea-SCR catalyst bed temperature threshold TempSCRth (i.e., whether or not the condition 1-2 described above is satisfied). The urea-SCR catalyst bed temperature threshold TempSCRth is set at a temperature equal to or higher than a temperature at which the urea-water is sufficiently hydrolyzed into ammonia in the urea-SCR catalyst 44. At this point in time, when the urea-SCR catalyst bed temperature TempSCR is not equal to or higher than the urea-SCR catalyst bed temperature threshold TempSCRth, the CPU makes a "No" determination at step 350 to directly proceed to step 395 to end the present routine tentatively. Consequently, the value of the supply control flag XNH3 is maintained at "0."

In contrast, when the urea-SCR catalyst bed temperature TempSCR is equal to or higher than the urea-SCR catalyst bed temperature threshold TempSCRth, the CPU makes a "Yes" determination at step 350 to proceed to step 360, at which the CPU determines whether or not the acid condensed water amount Sacidw is equal to or larger than the acid condensed water amount threshold Sacidwsth (i.e., whether or not the condition 1-3 described above is satisfied). The acid condensed water amount threshold Sacidwsth is set at "such an amount that it is likely that the engine members become corroded" if the acid condensed water whose amount is equal to or larger than the acid condensed water amount threshold Sacidwsth remains in the low pressure EGR passage and the intake passage. When the acid condensed water amount Sacidw is not equal to or larger than the acid condensed water amount threshold Sacidwsth, the CPU makes a "No" determination at step 360 to directly proceed to step 395, at which the CPU ends the present routine tentatively. Consequently, the value of the supply control flag XNH3 is maintained at "0."

In contrast, when the acid condensed water amount Sacidw is equal to or larger than the acid condensed water amount threshold Sacidwsth, the CPU makes a "Yes" determination at step 360 to proceed to step 370, at which the CPU sets the value of the supply control flag XNH3 to "1." Thereafter, the CPU proceeds to step 395 to end the present routine tentatively.

When the CPU again proceeds to step 310 in a state in which the value of the supply control flag XNH3 is set at "1" as described above, the CPU makes a "No" determination at step 310 to directly proceed to step 395, at which the CPU ends the present routine tentatively. Consequently, the value of the supply control flag XNH3 is maintained at "1." Accordingly, since the processes from step 250 to step 265 shown in FIG. 2 are executed, the urea-water for producing ammonia supply control is carried out so that the acid condensed water becomes neutralized.

<Urea-Water for Producing Ammonia Supply Control•Termination Determination>

Figure 4:
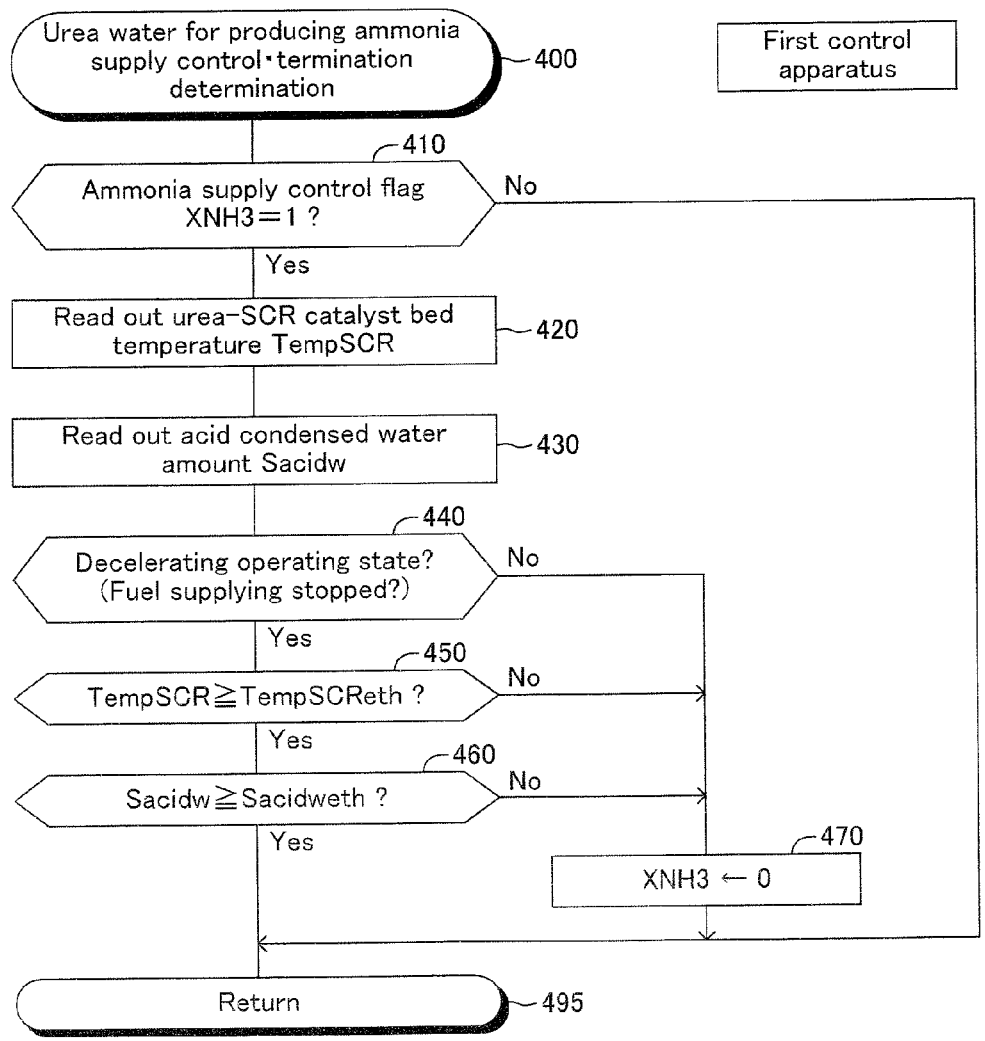
FIG. 4 is a flowchart showing a program executed by the CPU of the first control apparatus.

The CPU is configured so as to execute a "termination determination routine for the urea-water for producing ammonia supply control" shown by a flowchart in FIG. 4 every elapse of a predetermined time. Accordingly, at a predetermined point in time, the CPU starts processing from step 400 of FIG. 4 to proceed to step 410, at which the CPU determines whether or not the value of the supply control flag XNH3 is "1." When the value of the supply control flag XNH3 is "0", the CPU makes a "No" determination at step 410 to directly proceed to step 495 to end the present routine tentatively.

In contrast, when the value of the supply control flag XNH3 is "1", the CPU makes a "Yes" determination at step 410 to proceed to step 420, at which the CPU reads out the urea-SCR catalyst bed temperature TempSCR separately estimated in the routine described later. Subsequently, at step 430, the CPU reads out the acid condensed water amount Sacidw separately estimated in the routine described later. The acid condensed water amount Sacidw is gradually decreased when the urea-water for producing ammonia supply control is being carried out (i.e., when the value of the supply control flag XNH3 is "1").

Subsequently, the CPU proceeds to step 440 to determine whether or not the operating state of the engine 10 is the "decelerating operating state in which the fuel injection is stopped." More specifically, the CPU determines whether or not the operation amount Accp of the accelerator pedal is "0" and the engine rotational speed NE is equal to or higher than the engine rotational speed threshold NEth. When the operating state of the engine 10 is not the "decelerating operating state in which the fuel injection is stopped", the CPU makes a "No" determination at step 440 to proceed step 470, at which the CPU sets the value of the supply control flag XNH3 to "0." This terminates the urea-water for producing ammonia supply control.

In contrast, when the operating state of the engine 10 is the "decelerating operating state in which the fuel injection is stopped", the CPU makes a "Yes" determination at step 440 to proceed step 450, at which the CPU determines whether or not the urea-SCR catalyst bed temperature TempSCR is equal to or higher than a "catalyst bed temperature threshold for terminating the control TempSCReth smaller than the urea-SCR catalyst bed temperature threshold TempSCRsth." It should be noted that the catalyst bed temperature threshold for terminating the control TempSCReth is set at a "lowest temperature at which the urea-SCR catalyst 44 can produce ammonia and reduce NOx." When the urea-SCR catalyst bed temperature TempSCR is not equal to or higher than the catalyst bed temperature threshold for terminating the control TempSCReth, the CPU makes a "No" determination at step 450 to proceed to step 470, at which the CPU sets the value of the supply control flag XNH3 to "0." This terminates the urea-water for producing ammonia supply control.

In contrast, when the urea-SCR catalyst bed temperature TempSCR is equal to or higher than the catalyst bed temperature threshold for terminating the control TempSCReth, the CPU makes a "Yes" determination at step 450 to proceed step 460, at which the CPU determines whether or not the acid condensed water amount Sacidw is equal to or higher than an acid condensed water amount threshold for terminating the control Sacidwesth smaller than the acid condensed water amount threshold Sacidwsth." When the acid condensed water amount Sacidw is not equal to or higher than the acid condensed water amount threshold for terminating the control Sacidwesth, the CPU makes a "No" determination at step 460 to proceed to step 470, at which the CPU sets the value of the supply control flag XNH3 to "0." This terminates the urea-water for producing ammonia supply control.

In contrast, when the acid condensed water amount Sacidw is equal to or higher than the acid condensed water amount threshold for terminating the control Sacidwesth, the CPU makes a "Yes" determination at step 460 to directly proceed to step 495 to end the present routine tentatively. In this case, the value of the supply control flag XNH3 is maintained at "1." Accordingly, the urea-water for producing ammonia supply control continues to be carried out.

<Estimation of the Urea-SCR Catalyst Bed Temperature TempSCR and the Slip Catalyst Bed Temperature TempSLP>

Figure 5:
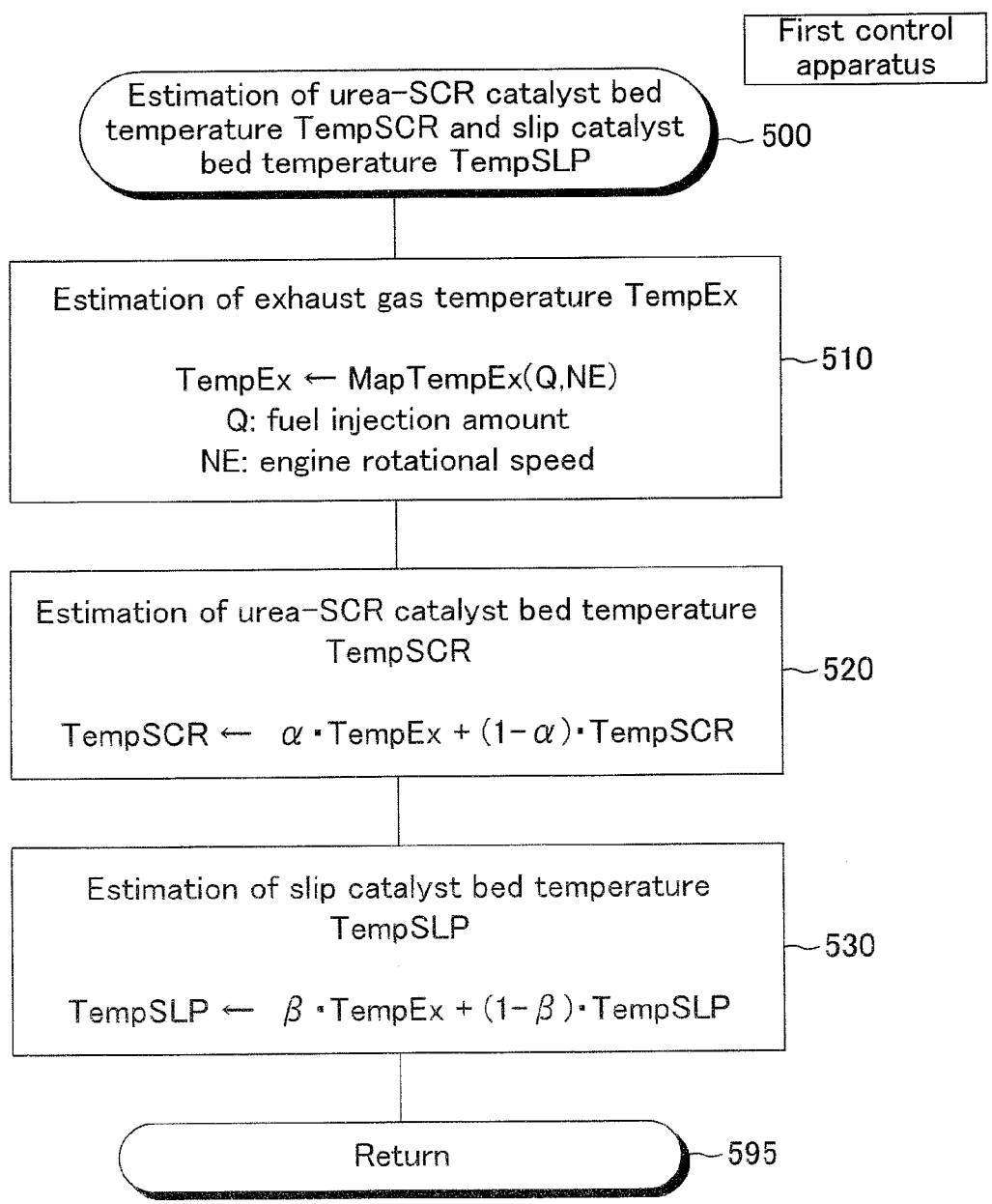
FIG. 5 is a flowchart showing a program executed by the CPU of the first control apparatus.

The CPU is configured so as to execute a routine shown by a flowchart in FIG. 5 every elapse of a predetermined time. Accordingly, at a predetermined point in time, the CPU starts processing from step 500 shown in FIG. 5 to sequentially execute processes from step 510 to step 530, and proceeds to step 595 to end the present routine tentatively.

Step 510: The CPU estimates an exhaust gas temperature TempEx based on the engine operating parameters (e.g., the fuel injection amount Q and the engine rotational speed NE). More specifically, the CPU estimates the exhaust gas temperature TempEx by applying an actual fuel injection amount Q and an actual engine rotational speed NE to a table MapTempEx which defines a relationship among the fuel injection amount Q, the engine rotational speed NE, and the exhaust gas temperature TempEx.

Step 520: The CPU estimates the urea-SCR catalyst bed temperature TempSCR according to a formula (5) described below. The urea-SCR catalyst bed temperature TempSCR(n+1) in the left side of the formula (5) is the urea-SCR catalyst bed temperature TempSCR after update, and the urea-SCR catalyst bed temperature TempSCR(n) in the right side of the formula (5) is the urea-SCR catalyst bed temperature TempSCR before update. Further, the value a in the formula (5) is a constant larger than "0" and smaller than "1."

$$\text{Temp}SCR(n+1)=\alpha \cdot \text{TempEx}+(1-\alpha) \cdot \text{Temp}SCR(n) \quad (5)$$

Step 530: The CPU estimates the slip catalyst bed temperature TempSLP according to a formula shown in a block of step 530, similar to the formula (5) described above. The value β in the formula is a constant larger than "0" and smaller than "1."

It should be noted that, if a urea-SCR catalyst bed temperature sensor is provided in the urea-SCR catalyst 44, the CPU may obtain the urea-SCR catalyst bed temperature TempSCR based on an output of the urea-SCR catalyst bed temperature sensor. Similarly, if a slip catalyst bed temperature sensor is provided in the slip catalyst 45, the CPU may obtain the slip bed temperature TempSLP based on an output of the slip catalyst bed temperature sensor.

<Acid Condensed Water Amount Sacidw Calculation Routine>

Figure 6:
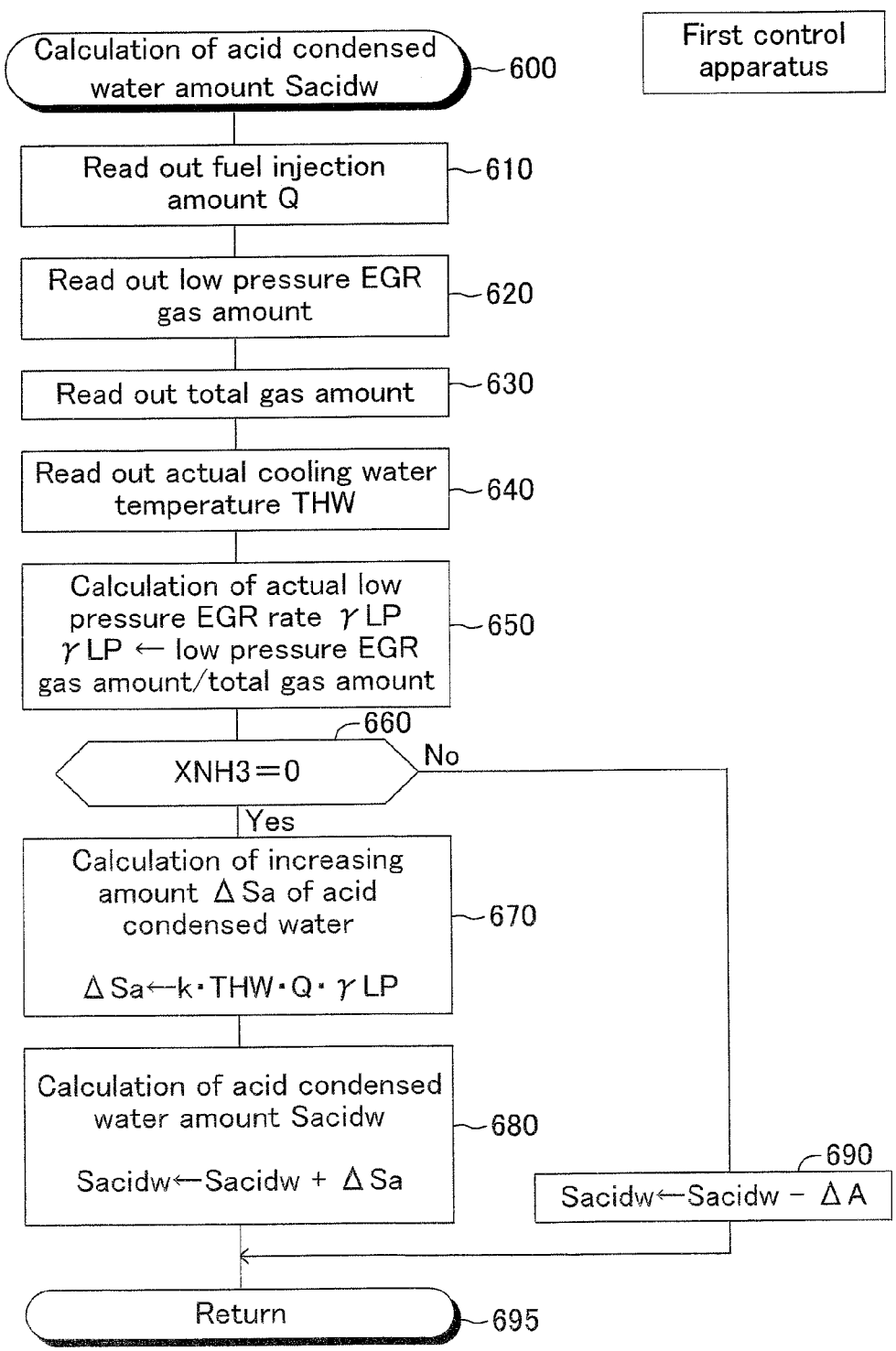
FIG. 6 is a flowchart showing a program executed by the CPU of the first control apparatus.

The CPU is configured so as to execute a routine shown by a flowchart in FIG. 6 every elapse of a predetermined time. Accordingly, at a predetermined point in time, the CPU starts processing from step 600 of FIG. 6 to sequentially execute processes from step 610 to step 650.

Step 610: The CPU reads out the fuel injection amount (instruction value) Q.

Step 620: The CPU reads out an actual low pressure EGR gas flow rate.

Step 630: The CPU reads out an actual total gas amount.

Step 640: The CPU reads out an actual cooling water temperature THW.

Step 650: The CPU calculates an actual low pressure EGR rate γLP by dividing the actual low pressure EGR gas flow rate by the actual total gas amount.

Subsequently, the CPU proceeds to step 660 to determine whether or not the value of the supply control flag XNH3 is "0." When the value of the supply control flag XNH3 is "0," the CPU makes a "Yes" determination at step 660 to sequentially execute processes of step 670 and step 680, and thereafter, proceeds to step 695 to end the present routine tentatively.

The CPU calculates an increasing amount ΔSa of the acid condensed water, according to a formula (6) described below.

$$\Delta Sa = k \cdot THW \cdot Q \cdot \gamma LP \quad (6)$$

The reasoning of the formula (6) described above is as follows.

An amount W1 of water vapor discharged into the exhaust passage from the engine 10 per unit time is proportional to the fuel injection amount Q. That is, $W1=k1 \cdot Q$.

An amount W2 of water vapor flowed into the intake passage via the low pressure EGR passage per unit time is proportional to a product of the amount W1 of water vapor and the actual low pressure EGR rate γLP. That is, $W2=k2 \cdot W1 \cdot \gamma LP = k1 \cdot k2 \cdot Q \cdot \gamma LP$.

A possibility that water vapor is condensed (become condensed water) in the low pressure EGR passage including the low pressure EGR cooler 62 and in the intake passage including the intercooler 34 is proportional to heat quantity deprived in the EGR passage and the intake passage, and that heat quantity is substantially proportional to the cooling water temperature THW. That is, an amount of the condensed water W3 produced per unit time is equal to $k3 \cdot THW \cdot W2 = k1 \cdot k2 \cdot k3 \cdot THW \cdot Q \cdot \gamma LP$.

The condensed water changes into the acid condensed water. Thus, when the $k1 \cdot k2 \cdot k3$ is replaced with k, the above formula (6) is obtained.

Step 680: The CPU estimates the acid condensed water amount Sacidw according to a formula (7) described below. The acid condensed water amount Sacidw(n+1) in the left side of the formula (7) is the acid condensed water amount Sacidw after update, and the acid condensed water amount Sacidw(n) in the right side of the formula (7) is the acid condensed water amount Sacidw before update. Thereafter, the CPU proceeds to step 695 to end the present routine tentatively. That is, the CPU accumulates the increasing amount ΔSa of the acid condensed water to obtain the acid condensed water amount Sacidw.

$$Sacidw(n+1)=Sacidw(n)+\Delta Sa \quad (7)$$

In contrast, when the value of the supply control flag XNH3 is "1", the urea-water for producing ammonia supply control is carried out, the acid condensed water is gradually neutralized by the ammonia. In view of this, if the supply control flag XNH3 is "1" when the CPU executes the process of step 660, the CPU makes a "No" determination at step 660 to proceed to step 690, at which the CPU obtains, as an updated acid condensed water amount Sacidw, a value obtained by subtracting a constant value ΔA from the acid condensed water amount Sacidw. Thereafter, the CPU proceeds to step 695 to end the present routine tentatively. It should be noted that, when the acid condensed water amount Sacidw becomes negative as the result of the calculation, the acid condensed water amount Sacidw is set to "0."

As described above, the first control apparatus includes:
a fuel supply section (fuel injection valves 21) for supplying a fuel to the internal combustion engine;
a urea-SCR catalyst 44 disposed in the exhaust passage of the engine;
a urea-water supply section (urea-water supply valve 46) for supplying the urea-water to the urea-SCR catalyst 44;
a low pressure gas recirculating section (low pressure EGR system 60); and
a control section.

The control section:
controls, based on the parameter(s) indicative of the operating state of the engine 10, an amount of the fuel supplied to the engine from the fuel supply section (fuel injection valves 21) (step 210 and step 215, shown in FIG. 2);
controls, based on the parameter(s) indicative of the operating state of the engine 10, an opening degree of the low pressure EGR valve 63 (step 225 and step 230, shown in FIG. 2); and
performs the urea-water for reducing nitrogen oxides supply control to control an amount of the urea-water supplied from the urea-water supply section based on the parameter(s) indicative of the operating state of the engine 10 in such a manner that ammonia of an amount estimated to be required to reduce nitrogen oxides contained in the exhaust gas is produced/generated in the urea-SCR catalyst 44 (step 245 shown in FIG. 2).

Further, the control section:
estimates, based on the parameter(s) indicative of the operating state of the engine, an amount of the acid condensed water, which is produced/generated by/from a gas passing through the low pressure EGR passage (low pressure EGR pipe 61), and which is accumulated in the low pressure EGR passage and the intake passage (routine shown in FIG. 6);

determines whether or not the specific condition is satisfied, the specific condition including the condition (step 360 shown in FIG. 3) that the estimated amount of the acid condensed water is equal to or larger than the acid condensed water amount threshold (steps from step 340 to step 360, shown in FIG. 3); and performs, when the specific condition is satisfied, the urea-water for producing ammonia supply control for a predetermined time (step 265 shown in FIG. 2 and the routine shown in FIG. 4) so as to set the amount of the urea-water supplied from the urea-water supply section to an "amount larger than an amount which is required for the urea-water for reducing nitrogen oxides supply control", so that ammonia flows out from the urea-SCR catalyst 44 while the gas flowing out from the urea-SCR catalyst 44 is passing through the low pressure EGR passage and flowing into the intake passage (steps from step 250 to step 260, shown in FIG. 2).

Accordingly, when the specific condition is satisfied, not all of the ammonia produced in the urea-SCR catalyst 44 is consumed to reduce NOx, and the ammonia flows out from the urea-SCR catalyst 4. The gas flowing out from the urea-SCR catalyst 44 flows into the intake passage through the low pressure EGR passage. Therefore, most of the ammonia flowing out from the urea-SCR catalyst 44 (or all of the ammonia flowing out from the urea-SCR catalyst 44, when the opening degree of the low pressure EGR valve 63 is the fully opened (maximum) opening degree, the opening degree of the exhaust throttle valve 47 is "0", and the opening degree of the high pressure EGR valve 52 is "0") passes through the low pressure EGR passage, and flows into the intake passage of the engine 10. Accordingly, the acid condensed water is neutralized by the ammonia. Consequently, the first control apparatus can reduce the possibility that the engine members corrode.

Further, the control section:

determines that the specific condition is satisfied when a condition that the engine is in the decelerating operating state is further satisfied (step 340 shown in FIG. 3); and stops, when the specific condition is satisfied, supplying the fuel from the fuel supply section (refer to the "Yes" determination at step 205 shown in FIG. 2), and sets the low pressure EGR valve opening degree to the "opening degree in the opening side (e.g., fully opened opening degree), larger than the opening degree of the low pressure EGR valve immediately before the specific condition becomes satisfied" (step 250 shown in FIG. 2).

According to the configuration described above, the low pressure EGR valve opening is set to the larger opening degree when the engine 10 is in the decelerating operating state, and thus the fuel supply is terminated (i.e., when it is not necessary to consider worsening of the combustion state due to the gas passing through the low pressure EGR passage). Therefore, a large amount of the gas containing the ammonia which has flowed out from the urea-SCR catalyst 44 can be recirculated into the intake passage. Consequently, the acid condensed water can be neutralized in a short time.

Further, the first control apparatus comprises the exhaust throttle valve 47, which is disposed at the position downstream of the connecting position between the low pressure EGR passage and the exhaust passage, and which varies the passage cross sectional area of the exhaust passage. In addition, when the specific condition is satisfied, the control section changes the opening degree of the exhaust throttle valve 47 to the "opening degree in the closing side (e.g., fully closed opening degree) smaller than the opening degree of the exhaust throttle valve 47 immediately before the specific condition becomes satisfied" (step 255 shown in FIG. 2).

Accordingly, it is realized to recirculate a great amount of the "gas containing the ammonia" flowed out from the urea-SCR catalyst 44 into the intake passage via the low pressure EGR passage. Consequently, the acid condensed water can be neutralized in a shorter time.

Further, the first control apparatus comprises:

the supercharger including the turbine 43 disposed at the position upstream of the urea-SCR catalyst 44 in the exhaust passage, and the compressor 35 disposed at the position downstream of the "connecting position between the low pressure EGR passage and the intake passage" to be rotated by the turbine 43; and the high pressure gas recirculating section (high pressure EGR system 50) including the high pressure EGR pipe 51 which forms/constitutes the high pressure EGR passage communicating between the position upstream of the turbine 43 in the exhaust passage and the position downstream of the compressor 35 in the intake passage, and the high pressure EGR valve 52 disposed in the high pressure EGR pipe wherein the opening degree is varied so as to vary the passage cross sectional area of the high pressure EGR passage.

Further, the control section changes, when the specific condition becomes satisfied, the opening degree of the high pressure EGR valve 52 to the "opening degree (e.g., fully closed opening degree) in the closing side, which is smaller than the opening degree of the high pressure EGR valve 52 immediately before the specific condition becomes satisfied (step 260 shown in FIG. 2).

This enables a larger amount of the "gas containing ammonia" flowed out from the urea-SCR catalyst to be recirculated into the intake passage via the low pressure EGR passage. Consequently, the acid condensed water can be neutralized in a shorter time. It should be noted that the first control apparatus may continue to perform the urea-water for producing ammonia supply control for a predetermined/constant time as long as the engine is being in the decelerating operating state wherein the fuel supply is stopped.

Second Embodiment

Next, a control apparatus for the internal combustion engine (hereinafter, simply referred to as a "second control apparatus") according to a second embodiment of the present invention will be described. The second control apparatus performs a urea-water for producing ammonia supply control, when a specific condition described below is/becomes satisfied while the fuel supply is being carried out, and the low pressure EGR gas recirculating control using the low pressure EGR system and the urea-water for reducing nitrogen oxides supply control are being carried out.

(Condition 2-1) A flow rate of a gas passing through the low pressure EGR passage is equal to or larger than a predetermined flow rate threshold. In actuality, the actual low pressure EGR rate is equal to or larger than a low pressure EGR rate threshold.

(Condition 2-2) A bed temperature of the urea-SCR catalyst is equal to or higher than a urea-SCR catalyst bed temperature threshold.

(Condition 2-3) A bed temperature of the slip catalyst is equal to or higher than a slip catalyst bed temperature threshold.

(Condition 2-4) An estimated amount of the acid condensed water is equal to or larger than an acid condensed water amount threshold (threshold for starting the urea-water for producing ammonia supply control). It should be noted that the condition 2-4 is inevitable condition for the above described specific condition to be satisfied.

(Actual Operation)

Figure 7:
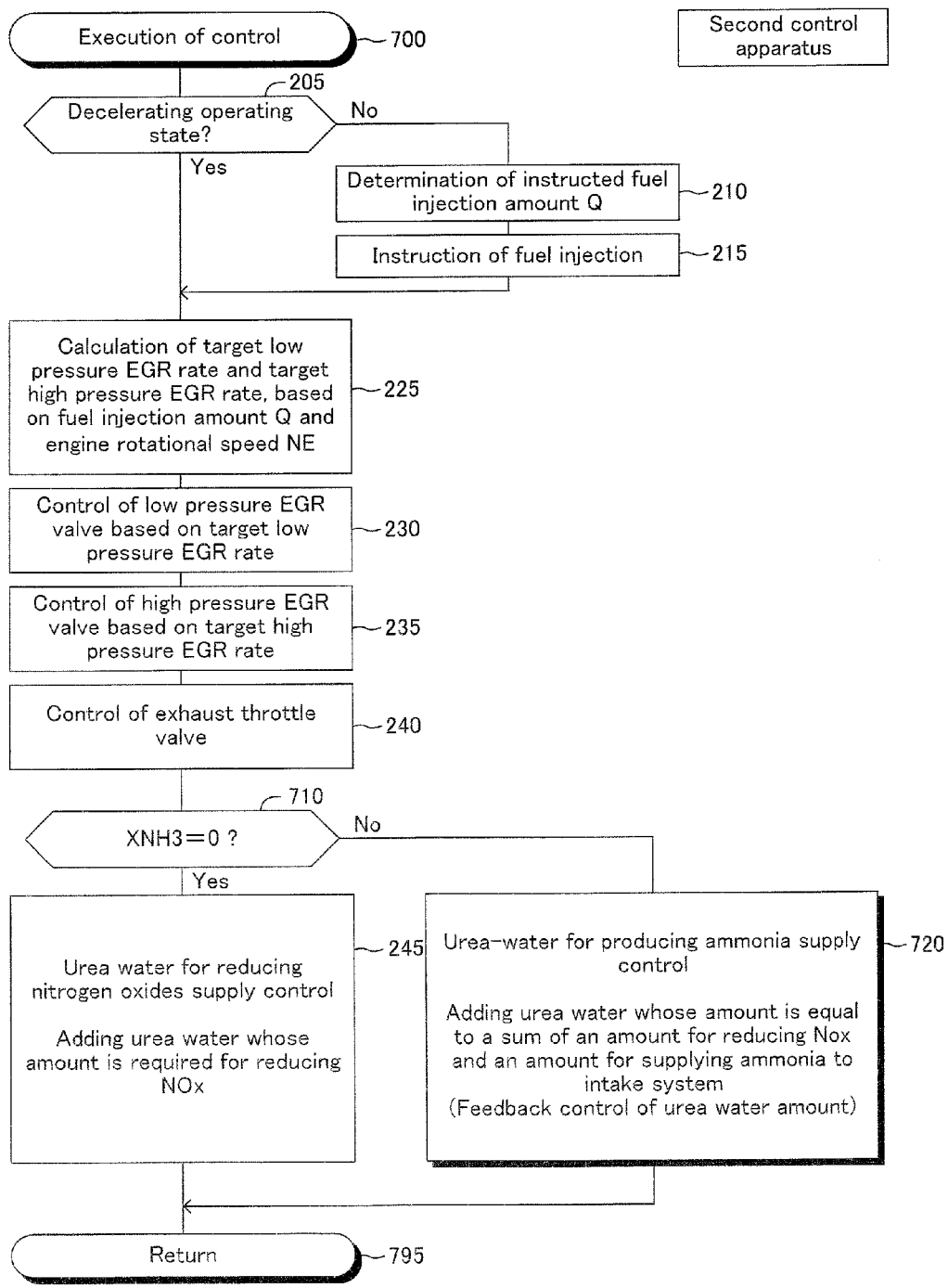
FIG. 7 is a flowchart showing a program executed by a CPU of a control apparatus (second control apparatus) for an internal combustion engine according to a second embodiment of the present invention.
Figure 8:
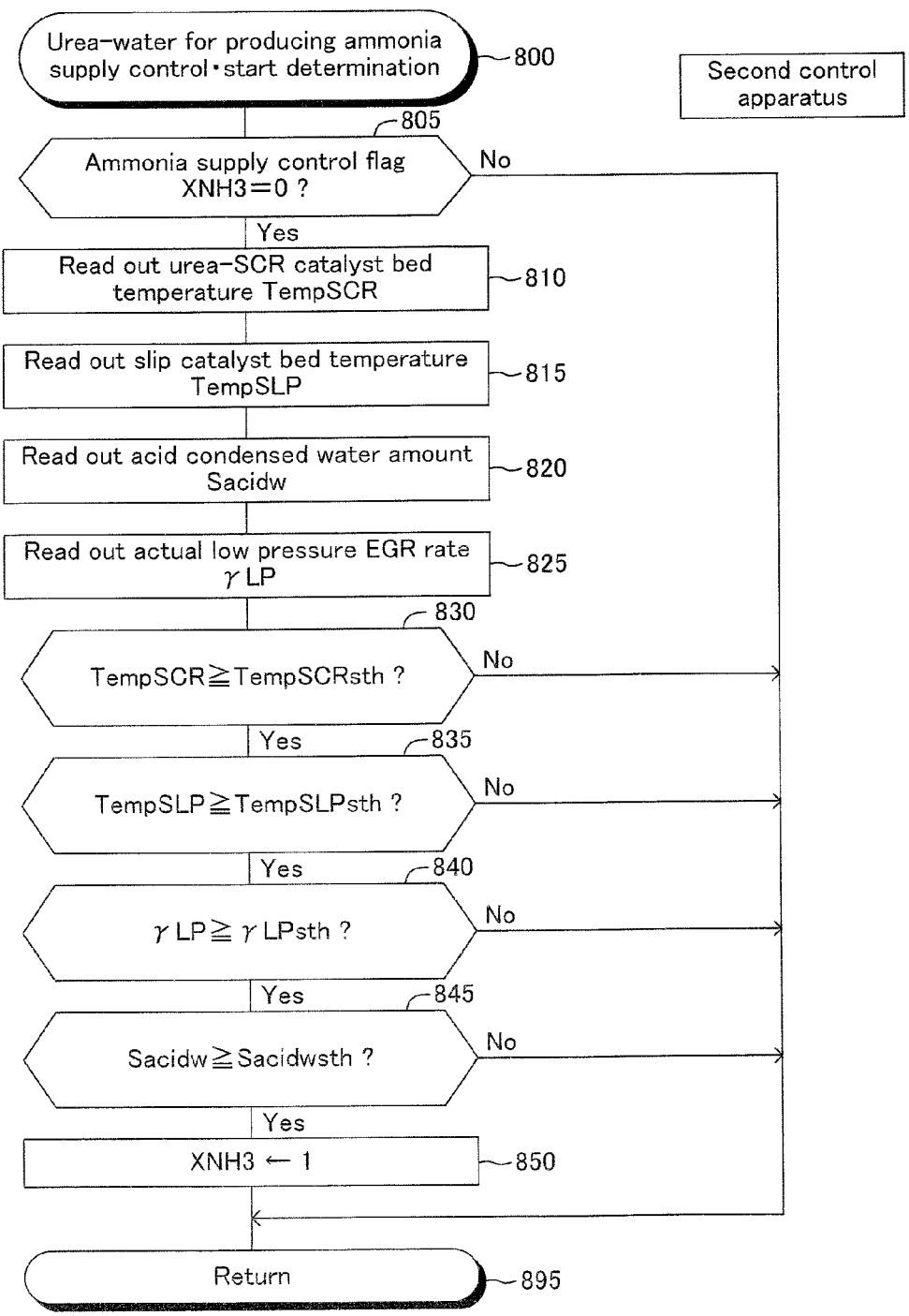
FIG. 8 is a flowchart showing a program executed by the CPU of the second control apparatus.
Figure 9:
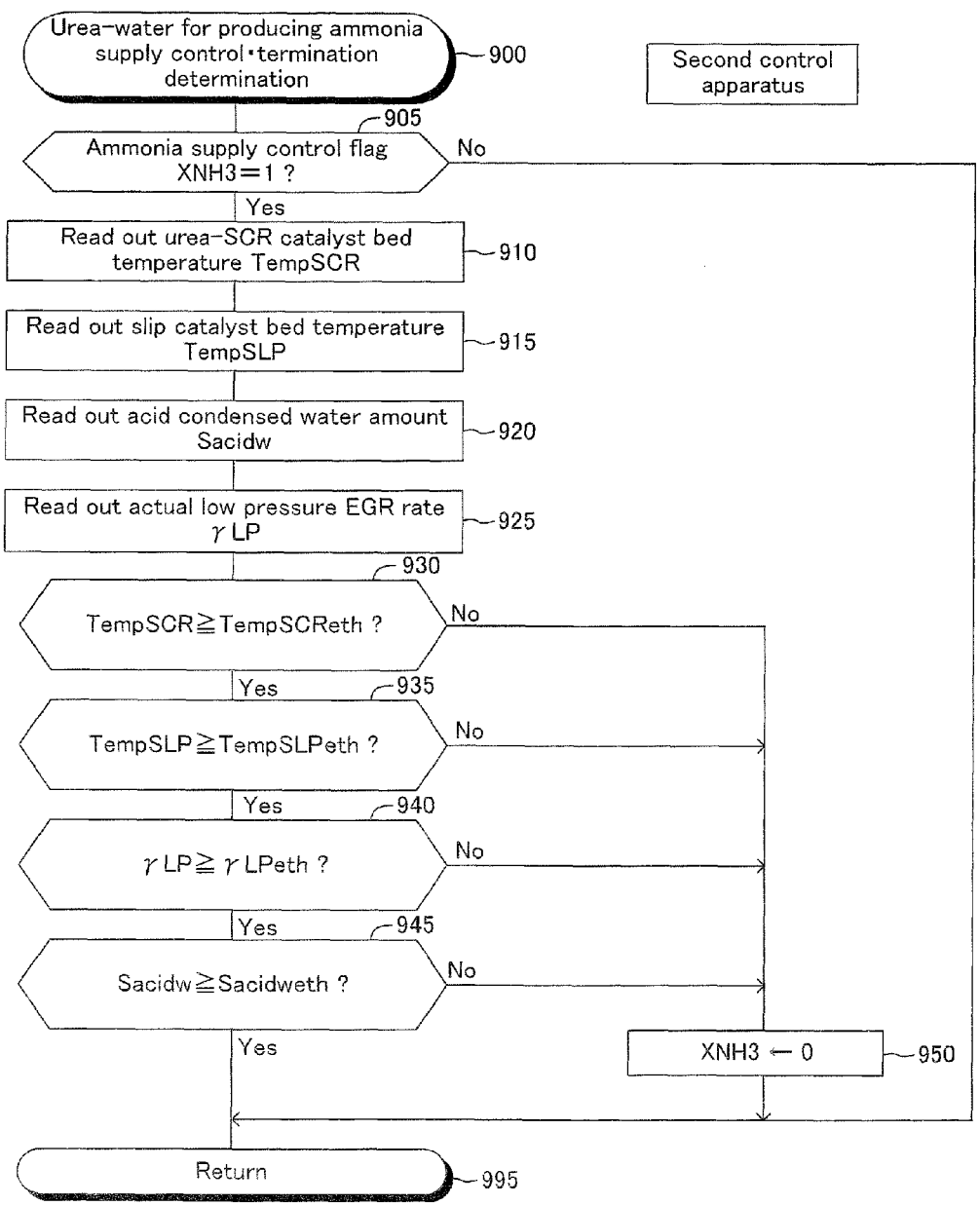
FIG. 9 is a flowchart showing a program executed by the CPU of the second control apparatus.
Figure 10:
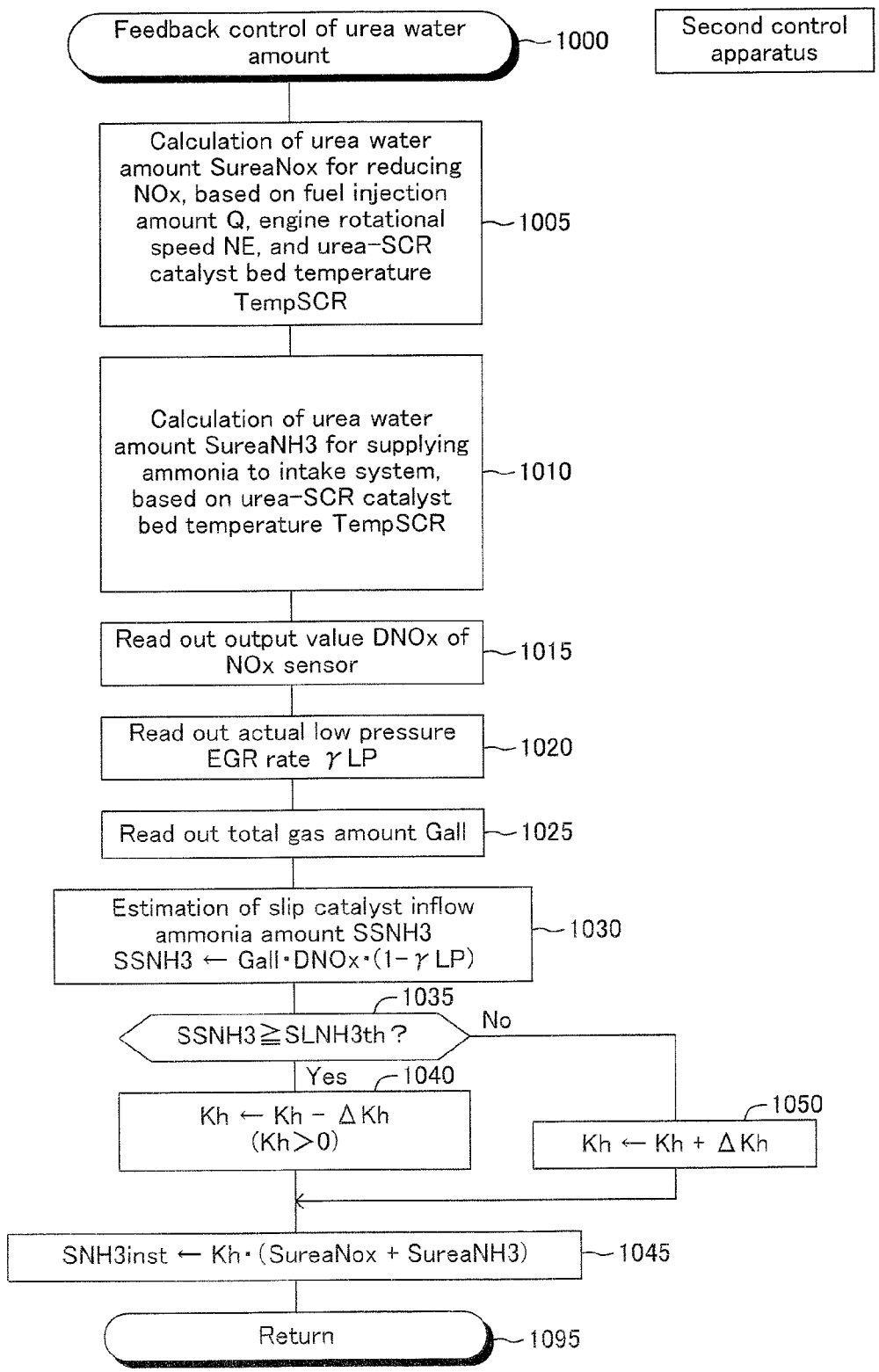
FIG. 10 is a flowchart showing a program executed by the CPU of the second control apparatus.

The second control apparatus is different from the first control apparatus in that a CPU of an electric controller 90 executes a routine shown in FIG. 7 in place of FIG. 2, a routine shown in FIG. 8 in place of FIG. 3, and routines shown in FIGS. 9 and 10 in place of FIG. 4. Accordingly, those differences will be mainly described, hereinafter. It should be noted that each step in FIG. 7 at which the same processing is performed as each step shown in FIG. 2 is given the same numeral as one given to such step shown in FIG. 2. Detail descriptions for those steps may be omitted appropriately.

<Execution of the Control>

The CPU is configured so as to repeatedly execute an "execution of the control routine" shown in FIG. 7 every elapse of a predetermined time. Accordingly, at a predetermined point in time, the CPU starts processing from step 700 of FIG. 7, and executes processes of steps from step 205 to step 215, and from step 225 to step 240. Accordingly, the fuel injection amount, the high pressure EGR valve opening degree, the low pressure EGR valve opening degree, and the opening degree of the exhaust throttle valve are controlled.

Subsequently, the CPU proceeds to step 710 to determine whether or not the value of the supply control flag XNH3 is equal to "0." When the value of the supply control flag XNH3 is "0", the CPU makes a "Yes" determination at step 710 to proceed to step 245, at which the CPU performs the urea-water for reducing nitrogen oxides supply control. Thereafter, the CPU proceeds to step 795 to end the present routine tentatively.

In contrast, if the value of the supply control flag XNH3 is "1" when the CPU executes the process of step 710, the CPU makes a "No" determination at step 710 to proceed to step 720, at which the CPU performs the urea-water for producing ammonia supply control. At this point in time, the CPU sets the opening degree of the exhaust throttle valve 47 to an opening degree other than the fully closed opening degree.

More specifically, the CPU determines, based on the engine operating parameters (e.g., the fuel injection amount Q and the engine rotational speed NE), an amount of the urea-water SureaNox, which is estimated to be necessary and sufficient for producing ammonia in the urea-SCR catalyst 44, an amount of the ammonia being required for purifying (reducing) NOx contained in the exhaust gas in the urea-SCR catalyst 44. Further, the CPU determines, based on the urea-SCR catalyst bed temperature, an amount of the urea-water SureaNH3, which is estimated to be necessary and sufficient for producing ammonia in the urea-SCR catalyst 44, an amount of the ammonia necessary for neutralizing the acid condensed water in the low pressure EGR passage and the intake passage. It should be noted that the amount of the urea-water SureaNH3 may be constant.

In addition, the CPU supplies the urea-water of an amount equal to a sum (SureaNox+SureaNH3) of the amount SureaNox and the amount SureaNH3 from the urea-water supply valve 46. At this point in time, the CPU may performs a urea-water amount feedback control shown in FIG. 10. Thereafter, the CPU proceeds to step 795 to end the present routine tentatively. This allows the ammonia to flow into the low pressure EGR gas passage and the intake passage together with the low pressure EGR gas. Accordingly, the acid condensed water is neutralized.

<Urea-Water for Producing Ammonia Supply Control•Start Determination>

The CPU is configured so as to execute a "routine of start determination for the urea-water for producing ammonia supply control" shown by a flowchart in FIG. 8 every elapse of a predetermined time. Accordingly, at a predetermined point in time, the CPU starts processing from step 800 of FIG. 8 to proceed to step 805, at which the CPU determines whether or not the value of the supply control flag XNH3 is "0."

It is assumed here that the value of the supply control flag XNH3 is "0." In this case, the CPU makes a "Yes" determination at step 805 to sequentially execute processes from step 810 to step 825 described below, and then proceeds to step 830.

Step 810: The CPU reads out the urea-SCR catalyst bed temperature TempSCR which is separately estimated in the routine shown in FIG. 5.

Step 815: The CPU reads out the slip catalyst bed temperature TempSLP which is separately estimated in the routine shown in FIG. 5.

Step 820: The CPU reads out the acid condensed water amount Sacidw which is separately estimated in the routine shown in FIG. 6.

Step 825: The CPU reads out the actual low pressure EGR rate γLP which is separately estimated in the routine shown in FIG. 6.

Subsequently, at step 830, the CPU determines whether or not the urea-SCR catalyst bed temperature TempSCR is equal to or higher than the urea-SCR catalyst bed temperature threshold TempSCRsth (i.e., whether or not the condition 2-2 described above is satisfied). At this point in time, when the urea-SCR catalyst bed temperature TempSCR is not equal to or higher than the urea-SCR catalyst bed temperature threshold TempSCRsth, the CPU makes a "No" determination at step 830 to directly proceed to step 895 to end the present routine tentatively. Consequently, the value of the supply control flag XNH3 is maintained at "0."

In contrast, when the urea-SCR catalyst bed temperature TempSCR is equal to or higher than the urea-SCR catalyst bed temperature threshold TempSCRsth, the CPU makes a "Yes" determination at step 830 to proceed to step 835, at which the CPU determines whether or not the slip catalyst bed temperature TempSLP is equal to or higher than a slip catalyst bed temperature threshold TempSLPsth (i.e., whether or not the condition 2-3 described above is satisfied). The slip catalyst bed temperature threshold TempSLPsth is set at a temperature equal to or higher than a temperature at which the slip catalyst 45 can sufficiently purify ammonia. At this point in time, when the slip catalyst bed temperature TempSLP is not equal to or higher than the slip catalyst bed temperature threshold TempSLPsth, the CPU makes a "No" determination at step 835 to directly proceed to step 895 to end the present routine tentatively. Consequently, the value of the supply control flag XNH3 is maintained at "0."

In contrast, when the slip catalyst bed temperature TempSLP is equal to or higher than the slip catalyst bed temperature threshold TempSLPsth, the CPU makes a "Yes" determination at step 835 to proceed to step 840, at which the CPU determines whether or not the actual low pressure EGR rate γLP is equal to or higher than a low pressure EGR rate threshold γLPsth (i.e., whether or not the condition 2-1 described above is satisfied). At this point in time, when the actual low pressure EGR rate γLP is not equal to or higher than the low pressure EGR rate threshold γLPsth, the CPU makes a "No" determination at step 840 to directly proceed to step 895 to end the present routine tentatively. Consequently, the value of the supply control flag XNH3 is maintained at "0."

In contrast, when the actual low pressure EGR rate γLP is equal to or higher than the low pressure EGR rate threshold γLPsth, the CPU makes a "Yes" determination at step 840 to proceed to step 845, at which the CPU determines whether or not the acid condensed water amount Sacidw is equal to or larger than an acid condensed water amount threshold Sacidwsth (i.e., whether or not the condition 2-4 described above is satisfied). At this point in time, when the acid condensed water amount Sacidw is not equal to or larger than an acid condensed water amount threshold Sacidwsth, the CPU makes a "No" determination at step 845 to directly proceed to step 895 to end the present routine tentatively. Consequently, the value of the supply control flag XNH3 is maintained at "0."

In contrast, when the acid condensed water amount Sacidw is equal to or larger than an acid condensed water amount threshold Sacidwsth, the CPU makes a "Yes" determination at step 845 to proceed to step 850, at which the CPU sets the value of the supply control flag XNH3 to "1." Thereafter, the CPU proceeds to step 895 to end the present routine tentatively.

When the CPU again proceeds to step 805 in a state in which the value of the supply control flag XNH3 is set at "1" as described above, the CPU makes a "No" determination at step 805 to directly proceed to step 895, at which the CPU ends the present routine tentatively. Consequently, the value of the supply control flag XNH3 is maintained at "1."

<Urea-Water for Producing Ammonia Supply Control•Termination Determination>

The CPU is configured so as to execute a "termination determination routine for the urea-water for producing ammonia supply control" shown by a flowchart in FIG. 9 every elapse of a predetermined time. Accordingly, at a predetermined point in time, the CPU starts processing from step 900 of FIG. 9 to proceed to step 905, at which the CPU determines whether or not the value of the supply control flag XNH3 is "1." When the value of the supply control flag XNH3 is "0", the CPU makes a "No" determination at step 905 to directly proceed to step 995 to end the present routine tentatively.

In contrast, when the value of the supply control flag XNH3 is "1", the CPU makes a "Yes" determination at step 905 to sequentially execute processes of step 910 to step 925, and then, proceeds to step 930.

Step 910: The CPU reads out the urea-SCR catalyst bed temperature TempSCR which is separately estimated in the routine shown in FIG. 5.

Step 915: The CPU reads out the slip catalyst bed temperature TempSLP which is separately estimated in the routine shown in FIG. 5.

Step 920: The CPU reads out the acid condensed water amount Sacidw which is separately estimated in the routine shown in FIG. 6.

Step 925: The CPU reads out the actual low pressure EGR rate γLP which is separately estimated in the routine shown in FIG. 6.

Subsequently, the CPU proceeds to step 930 to determine whether or not the urea-SCR catalyst bed temperature TempSCR is equal to or higher than the catalyst bed temperature threshold for terminating the control TempSCReth. When the urea-SCR catalyst bed temperature TempSCR is not equal to or higher than the catalyst bed temperature threshold for terminating the control TempSCReth, the CPU makes a "No" determination at step 930 to proceed to step 950, at which the CPU sets the value of the supply control flag XNH3 to "0." This terminates the urea-water for producing ammonia supply control.

In contrast, when the urea-SCR catalyst bed temperature TempSCR is equal to or higher than the catalyst bed temperature threshold for terminating the control TempSCReth, the CPU makes a "Yes" determination at step 930 to proceed step 935, at which the CPU determines whether or not the slip catalyst bed temperature TempSLP is equal to or higher than a "slip catalyst bed temperature threshold for terminating the control TempSLPeth lower than the catalyst bed temperature threshold for terminating the control TempSCReth." It should be noted that the slip catalyst bed temperature threshold for terminating the control TempSLPeth is set to a lowest temperature at which the slip catalyst 45 can sufficiently purify ammonia. When the slip catalyst bed temperature TempSLP is not equal to or higher than the slip catalyst bed temperature threshold for terminating the control TempSLPeth, the CPU makes a "No" determination at step 935 to proceed to step 950, at which the CPU sets the value of the supply control flag XNH3 to "0." This terminates the urea-water for producing ammonia supply control.

In contrast, when the slip catalyst bed temperature TempSLP is equal to or higher than the slip catalyst bed temperature threshold for terminating the control TempSLPeth, the CPU makes a "Yes" determination at step 935 to proceed step 940, at which the CPU determines whether or not the actual low pressure EGR rate γLP is equal to or higher than a "low pressure EGR rate threshold for terminating the control γLPeth which is smaller than the low pressure EGR rate threshold γLPsth by a predetermined value". When the actual low pressure EGR rate γLP is not equal to or higher than the low pressure EGR rate threshold for terminating the control γLPeth, the CPU makes a "No" determination at step 940 to proceed to step 950, at which the CPU sets the value of the supply control flag XNH3 to "0." This terminates the urea-water for producing ammonia supply control.

In contrast, when the actual low pressure EGR rate γLP is equal to or higher than the low pressure EGR rate threshold for terminating the control γLPeth, the CPU makes a "Yes" determination at step 940 to proceed step 945, at which the CPU determines whether or not the acid condensed water amount Sacidw is equal to or larger than an acid condensed water amount threshold for terminating the control Sacidwesth. When the acid condensed water amount Sacidw is not equal to or larger than the acid condensed water amount threshold for terminating the control Sacidwesth, the CPU makes a "No" determination at step 945 to proceed to step 950, at which the CPU sets the value of the supply control flag XNH3 to "0." This terminates the urea-water for producing ammonia supply control.

In contrast, when the acid condensed water amount Sacidw is equal to or larger than the acid condensed water amount threshold for terminating the control Sacidwesth, the CPU makes a "Yes" determination at step 945 to directly proceed to step 950, at which the CPU ends the present routine tentatively. In this case, the value of the supply control flag XNH3 is maintained at "1." In this manner, the urea-water for reducing nitrogen oxides supply control and the urea-water for producing ammonia supply control are carried out.

<Urea-Water Amount Feedback Control>

The CPU may perform the urea-water amount feedback control when it executes the process of step 720 shown in FIG. 7. In a case in which the CPU carries out the urea-water amount feedback control, the CPU starts processing from step 1000 of FIG. 10 when the CPU proceeds to step 720 shown in FIG. 7 so as to sequentially execute processes from step 1005 to step 1030 described below.

Step 1005: The CPU calculates, based on the engine operating parameters (e.g., the fuel injection amount Q, the engine rotational speed NE, and the urea-SCR catalyst bed temperature TempSCR), a urea-water amount SureaNox. The urea-water amount SureaNox is an amount of the urea-water which should be supplied to the urea-SCR catalyst 44 to reduce NOx contained in the exhaust gas. In actuality, the electric controller 90 stores a table which defines a relationship between the engine operating parameters and the urea-water amount SureaNox, and calculates a current urea-water amount SureaNox by applying the engine operating parameters to the table.

Step 1010: The CPU calculates, based on the urea-SCR catalyst bed temperature TempSCR, a urea-water amount SureaNH3. The urea-water amount SureaNH3 is an amount of the urea-water for producing ammonia in the urea-SCR catalyst 44, an amount of the ammonia being necessary for neutralizing the acid condensed water in the low pressure EGR passage and the intake passage. In actuality, the electric controller 90 stores a table which defines a relationship between the urea-SCR catalyst bed temperature TempSCR and the urea-water amount SureaNH3, and calculates a current urea-water amount SureaNH3 by applying the current urea-SCR catalyst bed temperature TempSCR to the table. It should be noted that the amount of the urea-water SureaNH3 may be constant.

Step 1015: The CPU reads out the output value DNOx of the NOx sensor 76.

Step 1020: The CPU reads out the actual low pressure EGR rate γLP which is separately calculated (refer to step 650 shown in FIG. 6).

Step 1025: The CPU reads out the total gas amount Gall.

Step 1030: The CPU estimates the an amount SSNH3 of ammonia (slip catalyst inflow ammonia amount) flowing into the slip catalyst 45 according to a formula (8) described below.

$$SSNH3 = Gall \cdot DNOx \cdot (1-\gamma LP) \quad (8)$$

The reasoning of the formula (8) described above is as follows.

During the urea-water for producing ammonia supply control, an amount (=SureaNox+SureaNH3) of the urea-water is supplied to the urea-SCR catalyst 44, the amount being equal to or larger than an "amount (urea-water amount SureNox) of the urea-water which is should be supplied to the urea-SCR catalyst 44 required for reducing NOx contained in the exhaust gas. Accordingly, it is expected that NOx does not flow out from the urea-SCR catalyst 44. Therefore, the output value DNOx of the NOx sensor 76 becomes a value which is proportional only to an "ammonia concentration of the gas flowing out from the urea-SCR catalyst 44." Meanwhile, a total gas flow amount of a gas flowing into the slip catalyst 45 is equal to a product of the total gas amount Gall and a value (1−γLP). Accordingly, the right side of the formula (8) is the slip catalyst inflow ammonia amount SSNH3.

Subsequently, the CPU proceeds to step 1035 to determine whether or not the slip catalyst inflow ammonia amount SSNH3 is equal to or larger than an ammonia amount threshold SSNH3th. The ammonia amount threshold SSNH3th is an amount of ammonia which the slip catalyst 45 can purify. The ammonia amount threshold SSNH3th may be constant, or may be an amount which is determined in such a manner that the ammonia amount threshold SSNH3th becomes larger as the slip catalyst bed temperature TempSLP becomes higher.

When the slip catalyst inflow ammonia amount SSNH3 is equal to or larger than the ammonia amount threshold SSNH3th, it is likely that the ammonia passes through the slip catalyst 45. In view of this, in such a case, the CPU makes a "Yes" determination at step 1035 to proceed to step 1045, at which the CPU decreases a correction coefficient kh by a constant amount Δkh. Note that the correction coefficient kh is limited in such a manner that the correction coefficient kh is equal to or larger than 0. It should also be noted that the correction coefficient kh is set to "1" in the initial routine described above.

Thereafter, the CPU proceeds to step 1045 to determine a final urea-water supply amount SU by multiplying a "sum of the urea-water amount SureaNox and the urea-water amount SuraNH3" by the correction coefficient kh, and supplies the urea-water of the final urea-water supply amount SU from the urea-water supply valve 46 to the urea-SCR catalyst 44. Then, the CPU proceeds to step 795 shown in FIG. 7 through step 1095.

In contrast, if the slip catalyst inflow ammonia amount SSNH3 is smaller than the ammonia amount threshold SSNH3th when the CPU executes the process of step 1035, it is unlikely that the ammonia passes through the slip catalyst 45. Accordingly, a larger amount of ammonia can be produced in the urea-SCR catalyst 44, and the ammonia can be made to flow into the low pressure EGR passage and the intake passage. In view of the above, when the slip catalyst inflow ammonia amount SSNH3 is smaller than the ammonia amount threshold SSNH3th, the CPU makes a "No" determination at step 1035 to proceed to step 1050, at which the CPU increases the correction coefficient kh by the constant amount Δkh. Thereafter, the CPU executes the process of step 1045 to determine the final urea-water supply amount SU so that the CPU supplies the urea-water of the final urea-water supply amount SU to the urea-SCR catalyst 44 from the urea-water supply valve 46. Then, the CPU proceeds to step 795 shown in FIG. 7 through step 1095.

As described above, the second control apparatus comprises a control section, which performs the urea-water for reducing nitrogen oxides supply control (refer to step 245 shown in FIG. 7), and which performs the urea-water for producing ammonia supply control (refer to step 720 shown in FIG. 7) in which the control section sets an "amount of the urea-water supplied from the urea-water supply section" to an amount (SureaNox+SureaNH3) larger than an "amount SureaNox of the urea-water required for the urea-water for reducing nitrogen oxides supply control" in such a manner that the ammonia flows out from the urea-SCR catalyst 44, in a state in which the gas flowing out from the urea-SCR catalyst 44 is flowing into the intake passage via the low pressure EGR passage (i.e., during the low pressure EGR gas recirculation is being performed, refer to steps from step 225 to step 240 shown in FIG. 7), when the specific condition is satisfied, the specific condition including the condition that the estimated acid condensed water is equal to or larger than the acid condensed water amount threshold (refer to the routine shown in FIG. 8, especially step 845).

More specifically, the control section of the second control apparatus is configured so as to:

perform the low pressure EGR gas recirculating control to have the low pressure EGR gas flowing out from the urea-SCR catalyst 44 flow into the intake passage by varying the opening degree of the low pressure EGR valve based on the parameter(s) indicative of the operating state of the engine, when the fuel is supplied to the engine from the fuel supply section (refer to step 225, step 230, and step 240, shown in FIG. 7); and determine that the specific condition is satisfied when the condition that the gas passing through the low pressure EGR passage is equal to or larger than the predetermined flow rate threshold is further satisfied while the low pressure EGR gas recirculating control is being carried out (refer to the "Yes" determination at step 840 shown in FIG. 8).

In this manner, the second control apparatus carries out the urea-water for producing ammonia supply control when an amount of the gas flowing through the low pressure EGR passage is equal to or larger than the predetermined threshold amount (i.e., when the actual low pressure EGR rate γLP is equal to or higher than the low pressure EGR rate threshold γLPsth). Accordingly, the apparatus can recirculate a large part of the gas containing ammonia flowing out from the urea-SCR catalyst 44 into the intake passage via the low pressure EGR passage without having the gas flow into the slip catalyst 45. As a result, the acid condensed water can be neutralized without wastefully consuming the urea-water.

Further, the control section is configured so as to include the urea-SCR catalyst bed temperature estimating section (step 520 shown in FIG. 5), and so as to determine that the specific condition is satisfied when the condition that the estimated urea-SCR catalyst bed temperature is equal to or higher than the urea-SCR catalyst bed temperature threshold is further satisfied (refer to the "Yes" determination at step 830 shown in FIG. 8).

According to the above configuration, the urea-water for producing ammonia supply control is performed when the urea-water changes into the ammonia in the urea-SCR catalyst 44 without fail. Accordingly, wasteful consumption of the urea-water can be avoided.

In addition, the control section is configured:

so as to include the slip catalyst bed temperature estimating section which estimates, based on the parameter(s) indicative of the operating state of the engine, the slip catalyst bed temperature TempSLP (step 530 shown in FIG. 5);

so as to determine that the specific condition is satisfied when the condition that the estimated slip catalyst bed temperature is equal to or higher than the slip catalyst bed temperature threshold is further satisfied (refer to the "Yes" determination at step 835 shown in FIG. 8); and so as to set the opening degree of the exhaust throttle valve to the opening degree other than the fully closed opening degree when the specific condition is satisfied (refer to step 240 and step 720, shown in FIG. 7).

According to the configuration described above, the ammonia produced by the urea-water for producing ammonia supply control is purified by the slip catalyst 45, and thus, it can be avoided that the ammonia is discharged into the air.

Third Embodiment

Next, a control apparatus for the internal combustion engine (hereinafter, simply referred to as a "third control apparatus") according to a third embodiment of the present invention will be described. In a case in which a request (engine stop request) for stopping the engine operation has occurred/is generated, the third control apparatus stops the fuel supply, forcibly rotates the engine 10 with an external power, and performs the urea-water for producing ammonia supply control, when a condition that the acid condensed water amount is equal to or larger than the acid condensed water amount threshold.

(Actual Operation)

Figure 11:
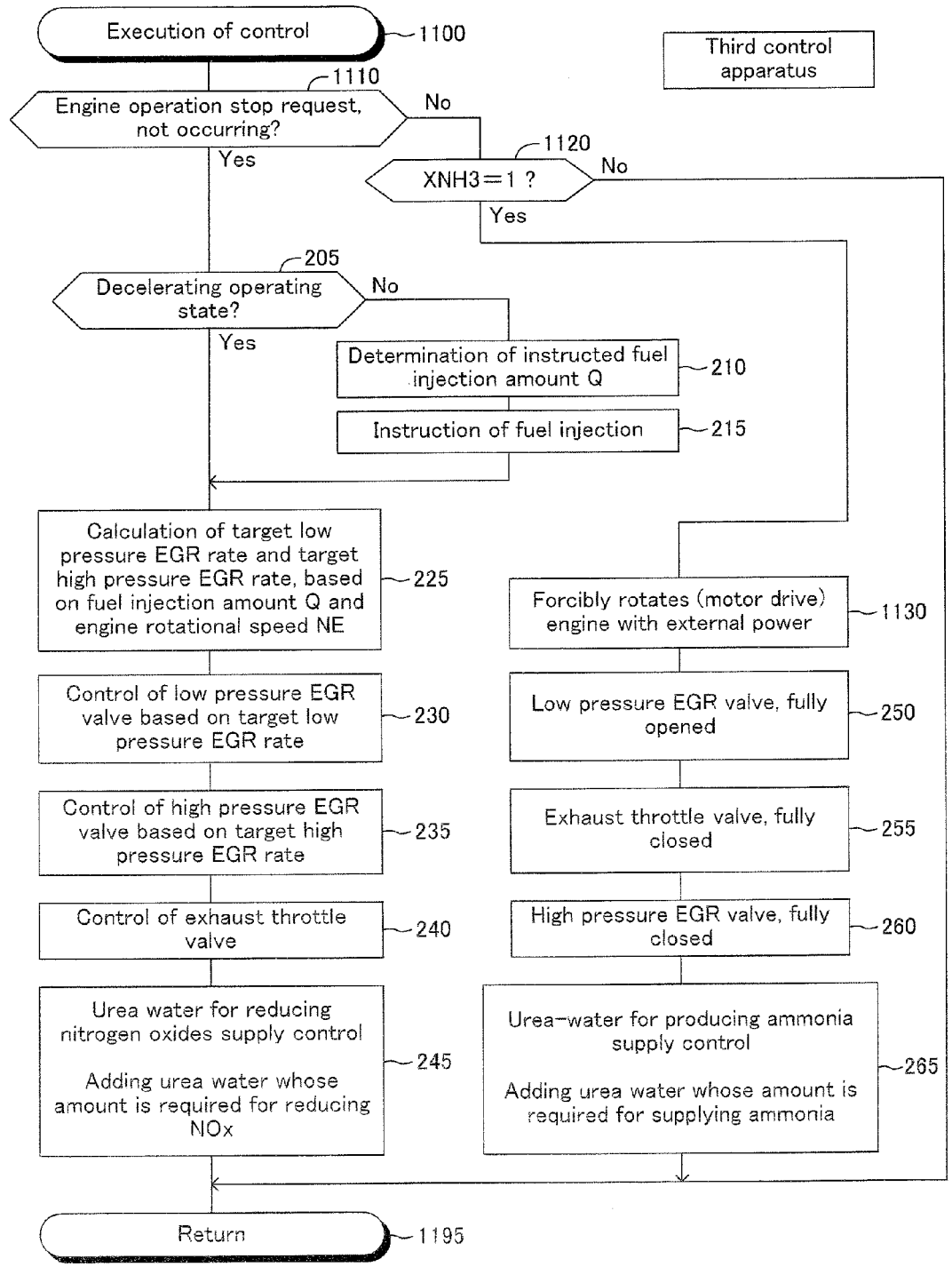
FIG. 11 is a flowchart showing a program executed by a CPU of a control apparatus (third control apparatus) for an internal combustion engine according to a third embodiment of the present invention.
Figure 12:
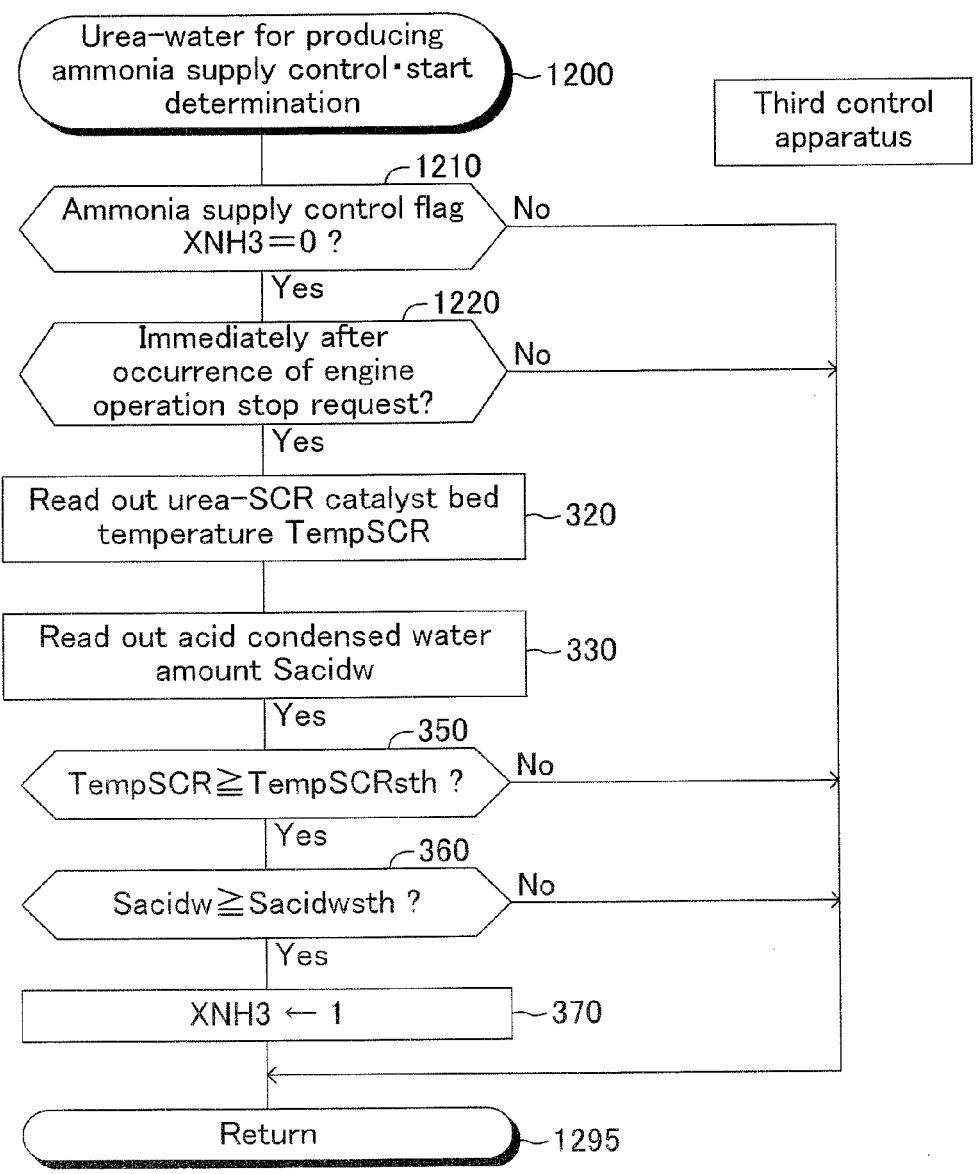
FIG. 12 is a flowchart showing a program executed by the CPU of the third control apparatus.
Figure 13:
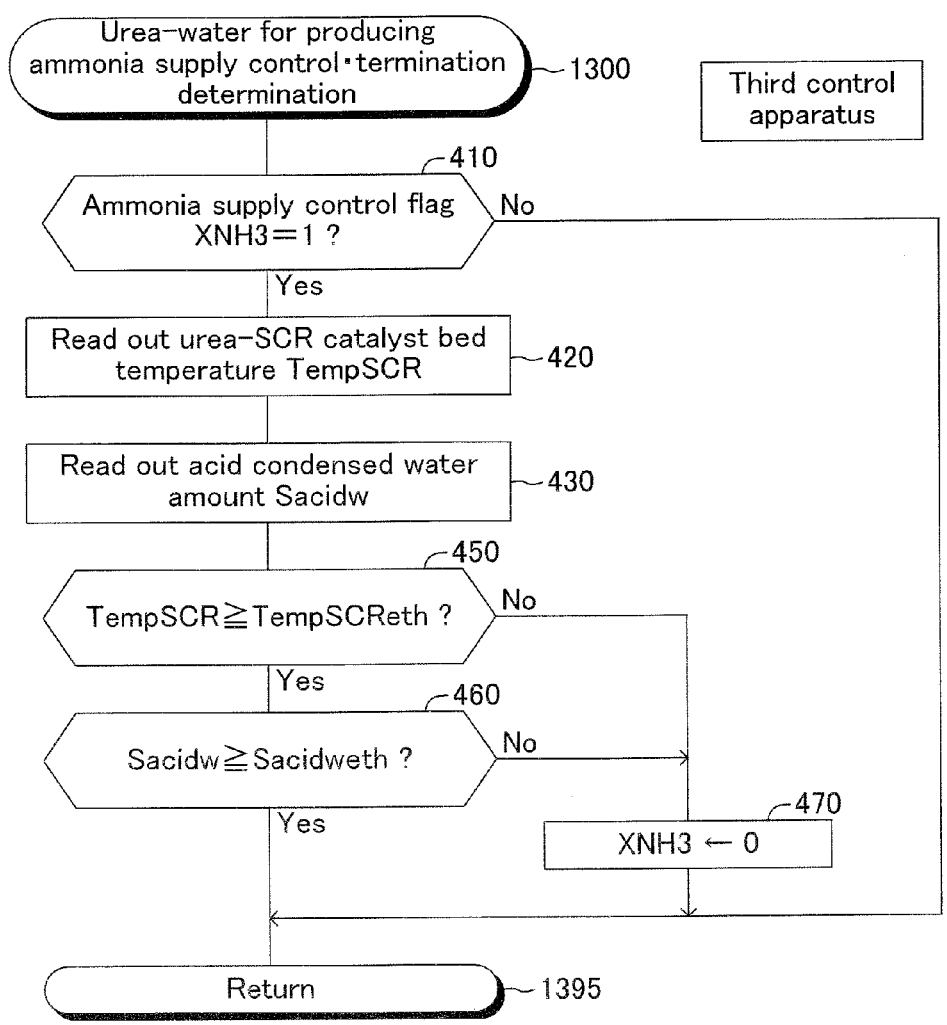
FIG. 13 is a flowchart showing a program executed by the CPU of the third control apparatus.

The third control apparatus is different from the first control apparatus in that a CPU of an electric controller 90 executes a routine shown in FIG. 11 in place of FIG. 2, a routine shown in FIG. 12 in place of FIG. 3, and routine shown in FIG. 13 in place of FIG. 4. Accordingly, those differences will be mainly described, hereinafter. It should be noted that each step in FIGS. 11 and 13 at which the same processing is performed as each step which has been already described is given the same numeral as one given to such step. Detail descriptions for those steps may be omitted appropriately.

<Execution of the Control>

The CPU is configured so as to repeatedly execute the "execution of the control routine" shown in FIG. 11 every elapse of a predetermined time. Accordingly, at a predetermined point in time, the CPU starts processing from step 1100 of FIG. 11 to proceed to step 1110, at which the CPU determines, based on a signal from the unillustrated ignition key switch, whether or not a "request (engine operation stop request) requiring the engine 10 to be stopped" is not occurring at a present point in time. When the engine operation stop request is not occurring, the CPU makes a "Yes" determination at step 1110 to execute processes from step 205 to step 215, and from step 225 to step 245. Accordingly, the fuel injection amount control, the low pressure EGR gas recirculation control, the high pressure EGR recirculation control, the urea-water for reducing nitrogen oxides supply control, an the like, for the normal operating state" are carried out. Thereafter, the CPU proceeds to step 1195 to end the present routine tentatively.

In contrast, if the engine operation stop request is occurring when the CPU executes the process of step 1110, the CPU makes a "No" determination at step 1110 to proceed to step 1120, at which the CPU determines whether or not the value of the supply control flag XNH3 is equal to "1."

It is assumed here that the value of the supply control flag XNH3 is "0." In this case, the CPU makes a "No" determination at step 1120 to directly proceed to step 1195 to end the resent routine tentatively. This stops the fuel supply, and thus, the operation of the engine 10 is stopped.

In contrast, if the value of the supply control flag XNH3 is "1" when the CPU executes the process of step 1120, the CPU makes a "Yes" determination at step 1120 to sequentially execute processes of step 1130, and from step 250 to step 265, described below, and then proceeds to step 1195 to end the resent routine tentatively. It should be noted that, as described later, the value of the supply control flag XNH3 is set to "1" if "the urea-SCR catalyst bed temperature TempSCR is equal to or higher than the urea-SCR catalyst bed temperature threshold TempSCRsth, and the acid condensed water amount Sacidw is equal to or larger than the acid condensed water amount threshold Sacidwsth (that is, when the specific condition becomes satisfied), when the engine operation stop request has occurred.

Step 1130: The CPU forcibly rotates the engine 10 by means of the motoring device (in the present example, starter) 22. That is, motoring of the engine 10 is carried out.

In this case, since the process of step 215 is not executed, the fuel is not being supplied to the engine 10.

Step 250: The CPU sends the instruction signal to the low pressure EGR valve actuator 63a in such a manner that the opening degree of the low pressure EGR valve 63 becomes the fully opened state (or the above described opening degree in the opening side).

Step 255: The CPU sends the instruction signal to the exhaust throttle valve actuator 47a in such a manner that the opening degree of the exhaust throttle valve 47 becomes the fully closed state (or the above described opening degree in the closing side).

Step 260: The CPU sends the instruction signal to the high pressure EGR valve actuator 52a in such a manner that the opening degree of the high pressure EGR valve 52 becomes the fully closed state (or the above described opening degree in the closing side).

Step 265: The CPU supplies a predetermined amount of the urea-water from the urea-water supply valve 46. That is, the CPU performs the urea-water for producing ammonia supply control. At this point in time, the CPU may change the predetermined amount in such a manner that the predetermined amount becomes larger as the urea-SCR catalyst bed temperature separately estimated becomes higher.

By means of the processes described above, the engine 10 is forcibly rotated, and thus, the engine 10 discharges air. Meanwhile, since the urea-water is supplied to the urea-SCR catalyst 44, a gas containing ammonia flows out from the urea-SCR catalyst 44. Further, the gas containing ammonia flows into the intake passage via the low pressure EGR passage. As a result, the acid condensed water is neutralized.

<Urea-Water for Producing Ammonia Supply Control•Start Determination>

The CPU is configured so as to execute a "routine of start determination for the urea-water for producing ammonia supply control" shown by a flowchart in FIG. 12 every elapse of a predetermined time. Accordingly, at a predetermined point in time, the CPU starts processing from step 1200 of FIG. 12 to proceed to step 1210, at which the CPU determines whether or not the value of the supply control flag XNH3 is "0."

It is assumed here that the value of the supply control flag XNH3 is "0." In this case, the CPU makes a "Yes" determination at step 1210 to proceed to step 1220, at which the CPU determines whether or not the "present point in time is immediately after the engine operation stop request occurred", based on the signal from the unillustrated ignition key switch. If the present point in time is not immediately after the engine operation stop request occurred, the CPU makes a "No" determination at step 1220 to directly proceed to step 1295, at which the CPU ends the present routine tentatively. Consequently, the value of the supply control flag XNH3 is maintained at "0."

In contrast, when the present point in time is immediately after the engine operation stop request occurred, the CPU makes a "Yes" determination at step 1220 to execute processes of step 320, step 330, and steps from step 350 to step 370 (refer to FIG. 3). Accordingly, the value of the supply control flag XNH3 is set to "1" in a case in which the urea-SCR catalyst bed temperature TempSCR is equal to or higher than the urea-SCR catalyst bed temperature threshold TempSCRsth, and the acid condensed water amount Sacidw is equal to or larger than the acid condensed water amount threshold Sacidwsth. In this case, as described above, the engine 10 is forcibly rotated, and the urea-water for producing ammonia supply control is carried out. In addition, when the CPU proceeds to step 1210 in the case in which the value of the supply control flag XNH3 is set to "1", the CPU makes a "No" determination at step 1210 to proceed to step 1295, at which the CPU ends the present routine tentatively. Consequently, the value of the supply control flag XNH3 is maintained at "1."

In contrast, when the urea-SCR catalyst bed temperature TempSCR is not equal to or higher than the urea-SCR catalyst bed temperature threshold TempSCRsth, or the acid condensed water amount Sacidw is not equal to or larger than the acid condensed water amount threshold Sacidwsth, in a case in which the value of the supply control flag XNH3 is maintained at "0" (and at the point in time immediately after the occurrence of the engine operation stop request), the CPU proceeds to step 1295 without executing the process of step 370. Consequently, the value of the supply control flag XNH3 is maintained at "0."

<Urea-Water for Producing Ammonia Supply Control•Termination Determination>

The CPU is configured so as to execute a "termination determination routine for the urea-water for producing ammonia supply control" shown by a flowchart in FIG. 13 every elapse of a predetermined time. The routine shown in FIG. 13 is a routine which is the same as the routine shown in FIG. 4 from which step 440 is omitted/eliminated.

Accordingly, the CPU proceeds to step 470 to set the value of the supply control flag XNH3 to "0", when the urea-SCR catalyst bed temperature TempSCR is not equal to or higher than the catalyst bed temperature threshold for terminating the control TempSCReth, and/or when the acid condensed water amount Sacidw is not equal to or higher than the acid condensed water amount threshold for terminating the control Sacidwesth, while the value of the supply control flag XNH3 is "1." This terminates the urea-water for producing ammonia supply control. Further, the motoring to forcibly rotate the engine 10 is terminated (refer to the "No" determination at step 1120, and step 1130, shown in FIG. 11). It should be noted that the CPU may continue to perform the motoring of the engine 10 and the urea-water for producing ammonia supply control, for a constant time period/duration from a point in time at which the value of the supply control flag XNH3 is changed from "0" to "1."

As described above, the third control apparatus includes a control section, which performs the urea-water for reducing nitrogen oxides supply control (refer to step 245 shown in FIG. 11), and which performs the urea-water for producing ammonia supply control for the predetermined time period (refer to step 265 shown in FIG. 11) in which the control section sets an amount of the urea-water supplied from the urea-water supply section to an amount larger than an amount of the urea-water required for the urea-water for reducing nitrogen oxides supply control in such a manner that the ammonia flows out from the urea-SCR catalyst 44 in a state in which the gas flowing out from the urea-SCR catalyst 44 is flowing into the intake passage via the low pressure EGR passage (refer to step 1130, and steps from step 250 to step 260 shown in FIG. 11), when the specific condition is satisfied, the specific condition including the condition that the estimated acid condensed water is equal to or larger than the acid condensed water amount threshold (refer to the routine shown in FIG. 12, especially step 360).

More specifically, the control section of the third control apparatus is configured:

so as to include a generation of an engine operation stop request determining section which determines whether or not the engine operation stop request to stop the engine operation is generated (refer to step 1220 shown in FIG. 12, and step 1110 shown in FIG. 11);

so as to stop supplying the fuel from the fuel supply section when the engine operation stop request occurs (refer to the "No" determination at step 1110 shown in FIG. 11, and the processes following the "No" determination); and so as to determine that the specific condition is satisfied when the condition that the estimated amount of the acid condensed water is equal to or larger than the acid condensed water amount threshold upon the occurrence of the engine operation stop request (refer to step 1220 and 360, shown in FIG. 12); and the control section further comprises a motor driving (motoring) section (step 1120 and step 1130, shown in FIG. 11) which forcibly rotates the engine 10 with an external power from a point in time at which the specific condition is satisfied to a point in time at which the estimated amount of the acid condensed water becomes smaller than the motor driving stop threshold (refer to step 460 and 470, shown in FIG. 13).

Consequently, the acid condensed water can be neutralized after the generation/occurrence of the engine operation stop request.

(Modification of the Third Control Apparatus)

A control section according to a modification of the third control apparatus, in a period from the point in time at which the specific condition becomes satisfied to the point in time at which the estimated amount of the acid condensed water becomes smaller than the motor driving stop threshold, continues to supply the fuel so as to have the engine operate in an idling state, has an appropriate amount of the low pressure EGR gas pass through a bypass passage if the low pressure EGR cooler 62 disposed in the low pressure EGR passage has the bypass passage, and has an appropriate amount of a gas pass through a bypass passage if the intercooler 34 disposed in the intake passage has the bypass passage. With this configuration, an excessive amount of the EGR gas does not flow into the engine, and thus, the idling state can be stably continued.

That is, the control section according to the modification of the third control apparatus may be configured:

so as to include the generation of an engine operation stop request determining section which determines whether or not the engine operation stop request to stop the engine operation occurs;

so as to determine that the specific condition is satisfied when the condition that the estimated amount of the acid condensed water is equal to or larger than the acid condensed water amount threshold in the case in which the engine operation stop request occurs; and so as to continue to operate the engine by continuing to supply the fuel to the engine from the fuel supply section from the point in time at which the specific condition becomes satisfied to the point in time at which the estimated amount of the acid condensed water becomes smaller than the engine stop threshold.

In addition, the control section of the third control apparatus or its modification is configured:

so as to include the urea-SCR catalyst bed temperature estimating section which estimates, based on the parameter (s) indicative of the operating state of the engine, the urea-SCR catalyst bed temperature which is the temperature of the bed of the urea-SCR catalyst (step 520 shown in FIG. 5); and so as to determine that the specific condition is satisfied when the condition that the estimated urea-SCR catalyst bed temperature is equal to or higher than the urea-SCR catalyst bed temperature threshold is further satisfied (step 350 shown in FIG. 12).

According to the above configuration, the urea-water for producing ammonia supply control is not performed when the urea-water can not be changed into the ammonia in the urea-SCR catalyst 44. Accordingly, wasteful consumption of the urea-water can be avoided.

Fourth Embodiment

Next, a control apparatus for the internal combustion engine (hereinafter, simply referred to as a "fourth control apparatus") according to a fourth embodiment of the present invention will be described. The first and second apparatuses perform the urea-water for producing ammonia supply control, and therefore, the ammonia remains in the low pressure EGR passage and the intake passage when the urea-water for producing ammonia supply control is terminated. In this state, if the operation of the engine 10 is stopped, and members for the low pressure EGR system or the intake system members are removed for a repair or a checkup, the ammonia is released into the air.

In view of the above, the fourth control apparatus determines whether or not the "ammonia produced by the urea-water for producing ammonia supply control" is remaining in the intake passage when the engine operation stop request has occurred, and continues to supply the fuel to the engine when it is determined that the ammonia produced is remaining in the intake passage so that the engine continues to be operated till the "ammonia in the intake passage is eliminated (scavenged)." That is, the ammonia eliminating control is carried out for a predetermined time. It should be noted that the gas in the low pressure EGR passage flows into the intake passage, and therefore, no ammonia remains in the low pressure EGR passage if no ammonia remains in the intake passage.

(Actual Operation)

<Ammonia Eliminating (Scavenging) Control•Start Determination>

The fourth control apparatus executes the routines executed by the CPU of the first or second control apparatus. Further, the CPU of the fourth control apparatus is configured so as to repeatedly execute each of routines shown in FIGS. from 14 to 16, every elapse of a predetermined time. Accordingly, at a predetermined point in time, the CPU starts processing from step 1400 of FIG. 14 to proceed to step 1410, at which the CPU determines, based on the signal from the unillustrated ignition key switch, whether or not the "present point in time is immediately after the occurrence of the engine operation stop request." If the present point in time is not immediately after the engine operation stop request occurred, the CPU makes a "No" determination at step 1410 to set a value of an operation continuing flag XIDL to "0." It should be noted that the value of the operation continuing flag XIDL is set to "0" in the initial routine described above. Thereafter, the CPU proceeds to step 1495 to end the present routine tentatively.

In contrast, when the present point in time is immediately after the engine operation stop request occurred, the CPU makes a "Yes" determination at step 1410 to proceed to step 1430, at which the CPU reads out an "intake passage scavenging gas amount SINsoki which is separately calculated in a routine shown in FIG. 17." Subsequently, the CPU proceeds to step 1440 to determine whether or not the intake passage scavenging gas amount SINsoki is equal to or smaller than an intake passage volume VoIIN (including a gas passage volume of the intercooler 34 and the compressor 52).

When the intake passage scavenging gas amount SINsoki is larger than the intake passage volume VolIN, the CPU makes a "No" determination at step 1440 to proceed to step 1495 via step 1420. Consequently, the operation of the engine 10 is stopped.

In contrast, if the intake passage scavenging gas amount SINsoki is equal to or smaller than the intake passage volume VolIN, it is inferred that the "ammonia produced by the urea-water for producing ammonia supply control" remains in the intake passage. In this case, the CPU therefore makes a "Yes" determination at step 1440 to proceed to step 1450, at which the CPU continues the operation (idling operation) of the engine. That is, for example, the CPU executes the processes of step 210, step 215, steps from step 225 to step 245, shown in FIG. 2.

Subsequently, the CPU proceeds to step 1460 to set the value of the operation continuing flag XIDL to "1." Thereafter, the CPU proceeds to step 1495 to end the present routine tentatively.

<Ammonia Eliminating Control (Scavenging) Control•Termination Determination>

Figure 15:
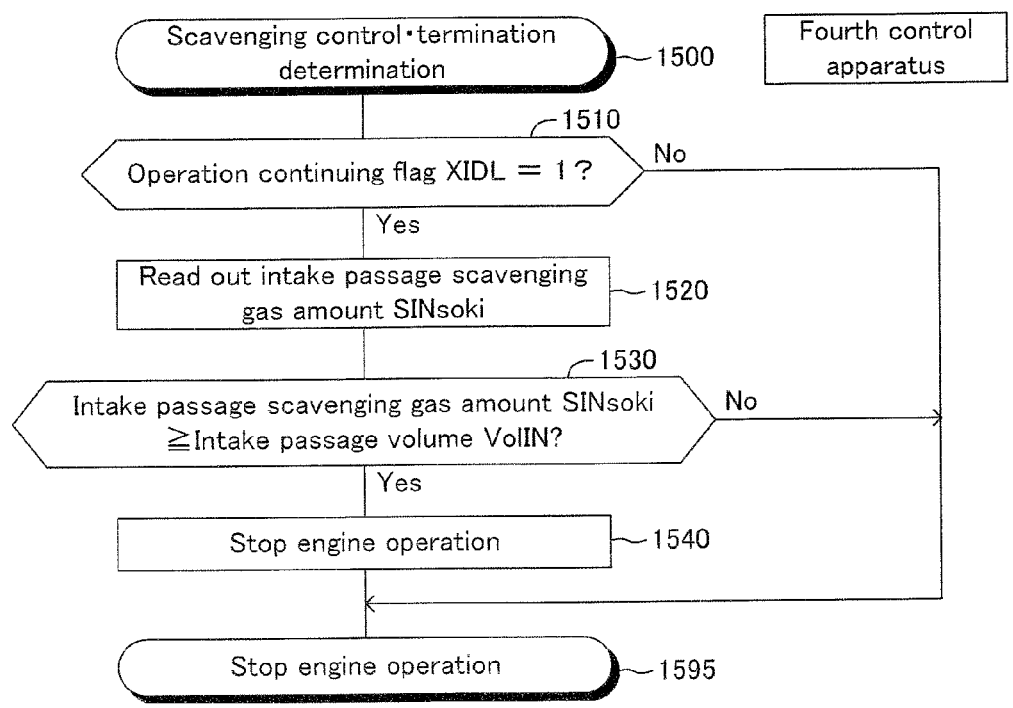
FIG. 15 is a flowchart showing a program executed by the CPU of the fourth control apparatus.

At a predetermined point in time, the CPU starts processing from step 1500 of FIG. 15 to proceeds step 1510, at which the CPU determines whether or not the value of the operation continuing flag XIDL is "1." When the value of the operation continuing flag XIDL is "0", the CPU directly proceeds to step 1595 to end the present routine tentatively.

In contrast, when the value of the operation continuing flag XIDL is "1", the CPU makes a "Yes" determination at step 1510 to proceed to step 1520, at which the CPU reads out the "intake passage scavenging gas amount SINsoki which is separately calculated by the routine shown in FIG. 17." Subsequently, the CPU proceeds to step 1530 to determine whether or not the intake passage scavenging gas amount SINsoki is equal to or larger than the intake passage volume VolIN. When the intake passage scavenging gas amount SINsoki is smaller than the intake passage volume VolIN, the CPU makes a "No" determination at step 1530 to directly proceed to step 1595, at which the CPU ends the present routine tentatively. Consequently, the value of the operation continuing flag XIDL is maintained at "1", so that the idling operation is continued.

In contrast, if the intake passage scavenging gas amount SINsoki is equal to or larger than the intake passage volume VolIN when the CPU executes the process of step 1530, it is inferred that the "ammonia produced by the urea-water for producing ammonia supply control" no longer remains in the intake passage. Therefore, the CPU makes a "Yes" determination at step 1530 to proceed to step 1540, at which the CPU stops the operation of the engine 10 by stopping the fuel injection (fuel supply) to the engine 10. Thereafter, the CPU proceeds to step 1595 to end the present routine tentatively. Consequently, the ammonia eliminating control is terminated.

<Calculation of Low Pressure EGR Passage Scavenging Gas Amount>

Figure 16:
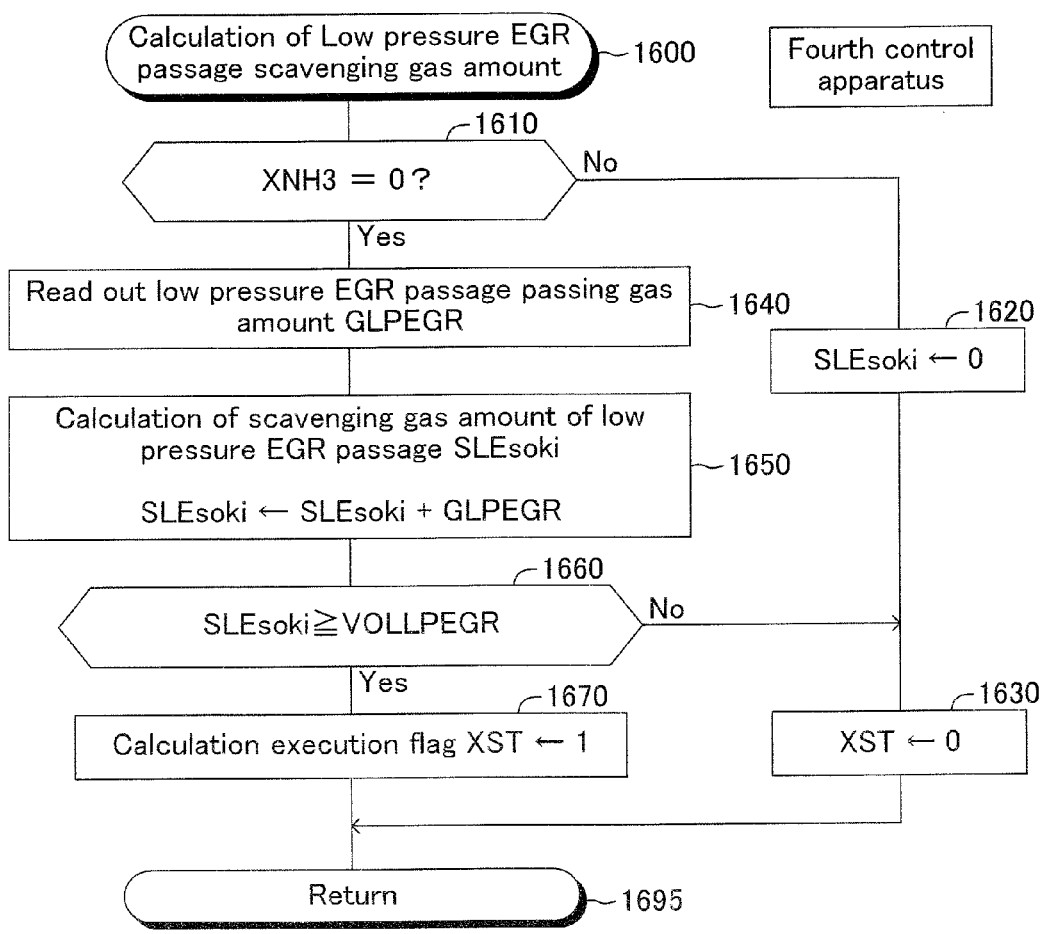
FIG. 16 is a flowchart showing a program executed by the CPU of the fourth control apparatus.

At an appropriate point in time, the CPU starts processing from step 1600 of FIG. 16 to proceeds step 1610, at which the CPU determines whether or not the value of the supply control flag XNH3 is "0." When the value of the supply control flag XNH3 is "1", the urea-water for producing ammonia supply control is being carried out, and therefore, the gas containing the ammonia is passing through the "low pressure EGR passage and the intake passage." In other words, a scavenging gas amount of the low pressure EGR passage SLEsoki is "0."

In view of the above, when the value of the supply control flag XNH3 is "1", the CPU makes a "No" determination at step 1610 to proceed to step 1620 to set the scavenging gas amount of the low pressure EGR passage SLEsoki to "0." Subsequently, the CPU proceeds to step 1630 to set a value of a calculation execution flag XST to "0." The value of the calculation execution flag XST is set to "0" in the initial routine described above. As described later, the calculation for the scavenging gas amount SINsoki is started when the value of the calculation execution flag XST is changed from "0" to "1."

In contrast, if the value of the supply control flag XNH3 is "0" when the CPU executes the process of step 1610, the urea-water for producing ammonia supply control is not being performed, and therefore, the low pressure EGR passage has been scavenged by a gas which substantially does not contain ammonia. Accordingly, the CPU makes a "Yes" determination at step 1610 to proceed to step 1640 to read out a low pressure EGR passage passing gas amount (low pressure EGR gas flow rate) GLPEGR.

Subsequently, the CPU proceeds to step 1650 to calculate the scavenging gas amount of the low pressure EGR passage (low pressure EGR passage scavenging amount) SLEsoki according to a formula (9) described below. The low pressure EGR passage scavenging amount SLEsoki(n+1) in the left side of the formula (9) is the low pressure EGR passage scavenging amount SLEsoki after update, and the low pressure EGR passage scavenging amount SLEsoki(n) in the right side of the formula (9) is the low pressure EGR passage scavenging amount SLEsoki before update.

$$\text{SLEsoki}(n+1) = \text{SLEsoki}(n) + \text{GLPEGR} \tag{9}$$

Subsequently, the CPU proceeds to step 1660 to determine whether or not the low pressure EGR passage scavenging amount SLEsoki is equal to or larger than a volume of the low pressure EGR passage (which includes a volume of a gas passage of the low pressure EGR cooler 62) VOLLPEGR. When the low pressure EGR passage scavenging amount SLEsoki is not equal to or larger than the volume of the low pressure EGR passage volume VOLLPEGR, the CPU makes a "No" determination at step 1660 to proceed to step 1695 via step 1630.

In contrast, when the low pressure EGR passage scavenging amount SLEsoki is equal to or larger than the volume of the low pressure EGR passage volume VOLLPEGR, the CPU makes a "Yes" determination at step 1660 to proceed to step 1670, at which the CPU sets the value of the calculation execution flag XST to "1", and then proceeds to step 1695 to end the present routine tentatively.

<Calculation of Intake Passage Scavenging Gas Amount>

Figure 17:
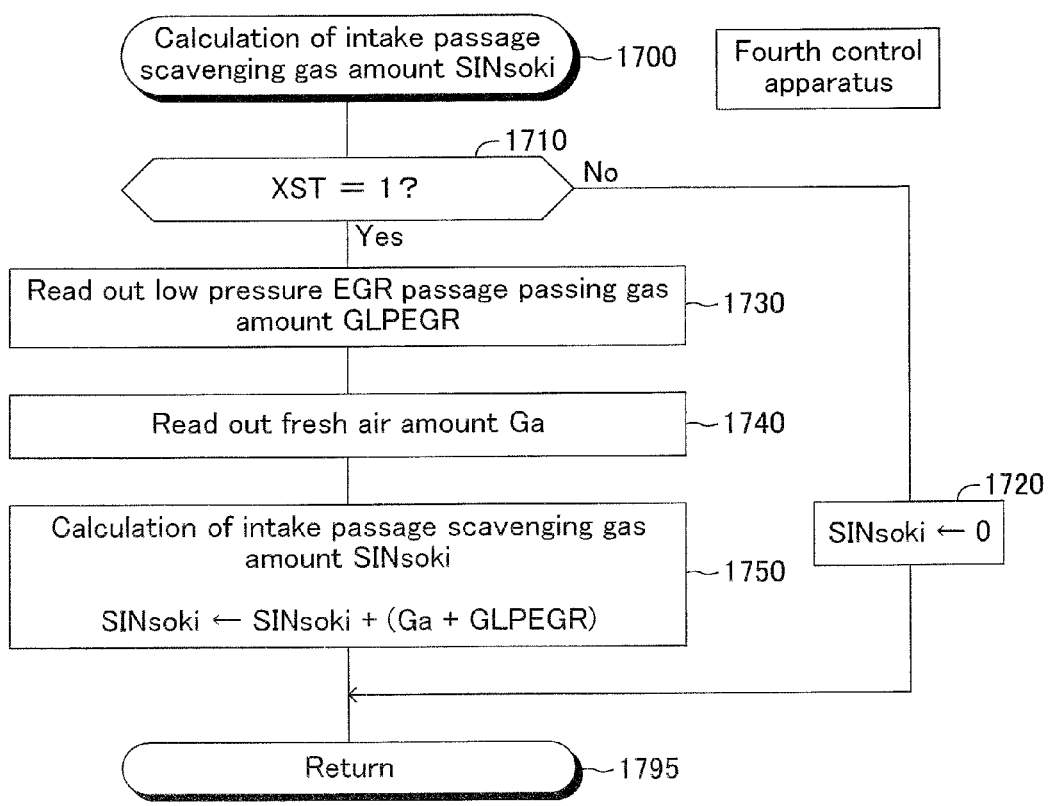
FIG. 17 is a flowchart showing a program executed by the CPU of the fourth control apparatus.

At an appropriate point in time, the CPU starts processing from step 1700 of FIG. 17 to proceeds step 1710, at which the CPU determines whether or not the value of the calculation execution flag XST is "1." When the value of the calculation execution flag XST is "0", the CPU makes a "No" determination at step 1710 to proceed to step 1720, at which the CPU sets a value of the scavenging gas amount SINsoki to "0."

In contrast, when the value of the calculation execution flag XST is set to "1" because the scavenging of the low pressure EGR passage has been completed, the CPU makes a "Yes" determination at step 1710 to proceed step 1730, at which the CPU reads out the low pressure EGR passage passing gas amount GLPEGR. Subsequently, at step 1740, the CPU reads out an "fresh air flow rate Ga measured by the air flow meter 71."

Subsequently, the CPU proceeds to step 1750 to calculate the scavenging gas amount of the intake passage (intake passage scavenging gas amount) SINsoki according to a formula (10) described below. The intake passage scavenging gas amount SINsoki(n+1) in the left side of the formula (10) is the intake passage scavenging gas amount SINsoki after update, and the intake passage scavenging gas amount SINsoki in the right side of the formula (10) is the intake passage scavenging gas amount SINsoki before update.

$$\text{SINsoki}(n+1) = \text{SINsoki}(n) + (Ga + \text{GLPEGR}) \tag{10}$$

Figure 14:
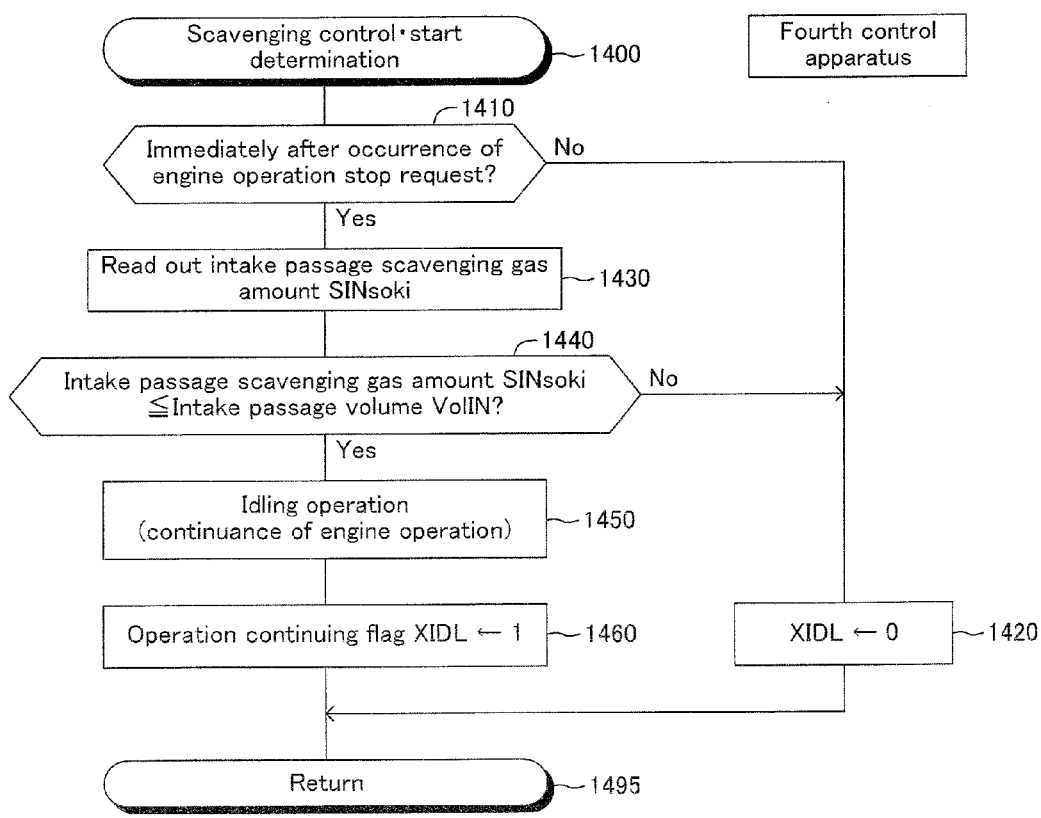
FIG. 14 is a flowchart showing a program executed by a CPU of a control apparatus (fourth control apparatus) for an internal combustion engine according to a fourth embodiment of the present invention.

As described above, the fourth control apparatus comprises:

a generation of the engine operation stop request determining section which determines whether or not the engine operation stop request to stop the operation of the engine 10 occurs (step 1410 shown in FIG. 14); and an ammonia remaining determining section which determines whether or not the "ammonia produced by the urea-water for producing ammonia supply control is remaining in the intake passage" when the engine operation stop request to stop the operation of the engine 10 occurs (step 1440 shown in FIG. 14);

and further performs, for a predetermined time, an ammonia eliminating control to have the fuel supply section continue to supply the fuel to the engine so that the engine continues to be operated in a state in which the urea-water is not supplied from the urea-water supply section (step 1450 shown in FIG. 14, and step 1530 and step 1540 shown in FIG. 15), when it is determined that the ammonia is remaining in the intake passage by the ammonia remaining determining section (refer to the "Yes" determination at step 1440 shown in FIG. 14).

According to the fourth control apparatus, the operation of the engine 10 is therefore stopped when the ammonia no longer remains in the low pressure EGR passage and the intake passage. Accordingly, it can be avoided that the ammonia is released into the air upon the repair or the checkup.

Further, the fourth control apparatus comprises a scavenging state estimating section, which estimates a first gas amount (scavenging gas amount of the low pressure EGR passage SLEsoki) which is an integrated/accumulated amount of a gas passing through the low pressure EGR passage after the stop of the execution of the urea-water for producing ammonia supply control (routine shown in FIG. 16); determines whether or not the estimated first gas amount becomes equal to or larger than the volume of the low pressure EGR passage (step 1660 shown in FIG. 16); and further estimates a second gas amount (intake passage scavenging gas amount SINsoki) which is an integrated/accumulated amount of a gas passing through the intake passage after the point in time at which the estimated first gas amount becomes equal to or larger than the volume of the low pressure EGR passage (step 1660 and step 1670 shown in FIG. 16, and the routine shown in FIG. 17).

Further, the ammonia remaining determining section determines that the ammonia is remaining in the intake passage in a case in which the estimated second gas amount (intake passage scavenging gas amount SINsoki) is not equal to or larger than the volume of the intake passage when the engine operation stop request occurs (refer to the "Yes" determination at step 1440 shown in FIG. 14).

According to the above configuration, it is possible to readily determine whether or not the ammonia is remaining in the low pressure EGR passage and the intake passage.

Further, the fourth control apparatus stops/terminates the ammonia eliminating control and stops the operation of the engine when the estimated second gas amount (intake passage scavenging gas amount SINsoki) becomes equal to or larger than the volume of the intake passage (step 1530 and step 1540, shown in FIG. 15). Accordingly, it can be avoided that the engine is wastefully continued to be operated.

As described above, each of the control apparatuses according to the embodiments of the present invention can neutralize the acid condensed water that is produced and remaining in the low pressure EGR passage and the intake passage with/using the ammonia produce in/by the urea-SCR catalyst 44. Therefore, the engine members are unlikely to be corroded by the acid condensed water, and the durability of the engine 10 is improved.

The present invention is not limited to the embodiments described above, various modifications may be adopted without departing from the scope of the invention. For example, the engine 10 to which the present invention can be applied may not include the high pressure EGR system.

The invention claimed is:

1. An exhaust system for an internal combustion engine, said exhaust system comprising:

a fuel injection valve which supplies a fuel to said internal combustion engine;

a urea-SCR catalyst, which is disposed in an exhaust passage of said engine, and which purifies nitrogen oxides contained in an exhaust gas discharged from said engine by reducing said nitrogen oxides with ammonia produced from urea-water supplied to said urea-SCR catalyst;

a urea-water supply valve which supplies said urea-water to said urea-SCR catalyst;

a low pressure gas recirculating section including a low pressure EGR pipe and a low pressure EGR valve disposed in said low pressure EGR pipe, wherein said low pressure EGR pipe forms a low pressure EGR passage communicating between a position downstream of said urea-SCR catalyst in said exhaust passage and an intake passage of said engine, and an opening degree of said low pressure EGR valve is varied so as to vary a passage cross sectional area of said low pressure EGR passage; and a controller including instructions which, when executed, perform the steps of:

controlling an amount of said fuel supplied to said engine from said fuel injection valve based on a parameter indicative of an operating state of said engine, controlling said opening degree of said low pressure EGR valve based on said parameter indicative of said operating state of said engine, and performing a urea-water supply-control-for-reducing-nitrogen-oxides to control an amount of said urea-water supplied from said urea-water supply valve based on said parameter indicative of said operating state of said engine in such a manner that ammonia of an amount estimated to be required to reduce nitrogen oxides contained in said exhaust gas is produced in said urea-SCR catalyst, estimating, based on said parameter indicative of said operating state of said engine, an amount of an acid condensed water which is produced from a gas passing through said low pressure EGR passage and is accumulated in said low pressure EGR passage and said intake passage;

determining whether or not a specific condition is satisfied, said specific condition including a condition that said estimated amount of said acid condensed water is equal to or larger than an acid condensed water amount threshold; and performing, when said specific condition is satisfied, a urea-water supply-control-for producing ammonia for a predetermined time to set an amount of said urea-water to be supplied from said urea-water supply valve to an amount larger than an amount required for said urea-water supply-control-for-reducing-nitrogen-oxides so that ammonia flows out from said urea-SCR catalyst while a gas flowing out from said urea-SCR catalyst is passing through said low pressure EGR passage and flowing into said intake passage.

2. The exhaust system according to claim 1, wherein said controller further includes instructions which, when executed, perform the steps of:

determining that said specific condition is satisfied when a condition that said engine is in a decelerating operating state is further satisfied; and when said specific condition becomes satisfied, stopping supplying said fuel from said fuel injection valve, and changing said opening degree of said low pressure EGR valve to a predetermined opening degree larger than an opening degree of said low pressure EGR valve immediately before said specific condition becomes satisfied.

3. The exhaust system according to claim 2 further comprising an exhaust throttle valve, which is disposed in said exhaust passage and at a position downstream of a connecting position of said low pressure EGR passage to said exhaust passage, and which varies a passage cross sectional area of said exhaust passage, wherein said controller further includes instructions which, when executed, perform the steps of:

changing, when said specific condition becomes satisfied, an opening degree of said exhaust throttle valve to a predetermined opening degree smaller than an opening degree of said exhaust throttle valve immediately before said specific condition becomes satisfied.

4. The exhaust system according to claim 2, further comprising:

a supercharger, which includes a turbine disposed at a position upstream of said urea-SCR catalyst in said exhaust passage, and a compressor disposed in said intake passage and at a position downstream of a connecting position of said low pressure EGR passage to said intake passage so as to be rotated by said turbine; and a high pressure gas recirculating section including a high pressure EGR pipe and a high pressure EGR valve disposed in said high pressure EGR pipe, wherein said high pressure EGR pipe forms a high pressure EGR passage communicating between a position upstream of said turbine in said exhaust passage and a position downstream of said compressor in said intake passage, and an opening degree of said high pressure EGR valve is varied so as to vary a passage cross sectional area of said high pressure EGR passage, wherein said controller further includes instructions which, when executed, perform the step of:

changing, when said specific condition becomes satisfied, said opening degree of said high pressure EGR valve to a predetermined opening degree smaller than an opening degree of said high pressure EGR valve immediately before said specific condition becomes satisfied.

5. The exhaust system according to claim 1, wherein said controller further includes instructions which, when executed, perform the steps of:

estimating based on said parameter indicative of said operating state of said engine, a urea-SCR catalyst bed temperature which is a temperature of a bed of said urea-SCR catalyst; and determining that said specific condition is satisfied when a condition that said estimated urea-SCR catalyst bed temperature is equal to or higher than a urea-SCR catalyst bed temperature threshold is further satisfied.

6. The exhaust system according to claim 1, wherein said controller further includes instructions which, when executed, perform the steps of:

perform a low pressure EGR gas recirculating control to have a low pressure EGR gas flowing out from said urea-SCR catalyst flow into said intake passage by varying said opening degree of said low pressure EGR valve based on said parameter indicative of said operating state of said engine, when said fuel is being supplied to said engine from said fuel injection valve; and determine that said specific condition is satisfied when a condition that a gas passing through said low pressure EGR passage is equal to or larger than a predetermined flow rate threshold is further satisfied while said low pressure EGR gas recirculating control is being carried out.

7. The exhaust system according to claim 6, wherein said controller further includes instructions which, when executed, perform the steps of:

estimating, based on said parameter indicative of said operating state of said engine, a urea-SCR catalyst bed temperature which is a temperature of a bed of said urea-SCR catalyst; and determining that said specific condition is satisfied when a condition that said estimated urea-SCR catalyst bed temperature is equal to or higher than a urea-SCR catalyst bed temperature threshold is further satisfied.

8. The exhaust system according to claim 7, further comprising:

a slip catalyst, which is disposed in said exhaust passage and at a position downstream of a connecting position of said low pressure EGR passage to said exhaust passage, and which purifies ammonia; and an exhaust throttle valve, which is disposed in said exhaust passage and at a position downstream of said connecting position of said low pressure EGR passage to said exhaust passage and upstream of said slip catalyst, and which varies a passage cross sectional area of said exhaust passage, wherein, said controller further includes instructions which, when executed, perform the steps of:

estimating, based on said parameter indicative of said operating state of said engine, a slip catalyst bed temperature which is a temperature of a bed of said slip catalyst;

determining that said specific condition is satisfied when a condition that said estimated slip catalyst bed temperature is equal to or higher than a slip catalyst bed temperature threshold is further satisfied; and setting said opening degree of said exhaust throttle valve to an opening degree other than a fully closed opening degree when said specific condition becomes satisfied.

9. The exhaust system according to claim 1, wherein said controller further includes instructions which, when executed, perform the steps of:

determining whether or not an engine operation stop request to stop an operation of said engine occurs;

stopping supplying said fuel from said fuel injection valve when said engine operation stop request occurs; and determining that said specific condition is satisfied when a condition that said estimated amount of said acid condensed water is equal to or larger than said acid condensed water amount threshold is satisfied in a case in which said engine operation stop request occurs, wherein, said controller further includes instructions which when executed, perform forcibly rotating said engine with an external power from a point in time at which said specific condition becomes satisfied to a point in time at which said estimated amount of said acid condensed water becomes smaller than a motor driving stop threshold.

10. The exhaust system according to claim 1, wherein said controller further includes instructions which, when executed, perform the steps of:

determining or not an engine operation stop request to stop an operation of said engine occurs;

determining that said specific condition is satisfied when a condition that said estimated amount of said acid condensed water is equal to or larger than said acid condensed water amount threshold in a case in which said engine operation stop request occurs; and continuing to operate said engine by continuing to supply said fuel to said engine from said fuel injection valve from a point in time at which said specific condition becomes satisfied to a point in time at which said estimated amount of said acid condensed water becomes smaller than an engine stop threshold.

11. The exhaust system according to claim 9, wherein said controller further includes instructions which, when executed, perform the steps of:

estimating, based on said parameter indicative of said operating state of said engine, a urea-SCR catalyst bed temperature which is a temperature of a bed of said urea-SCR catalyst; and determining that said specific condition is satisfied when a condition that said estimated urea-SCR catalyst bed temperature is equal to or higher than a urea-SCR catalyst bed temperature threshold is further satisfied.

12. The exhaust system according to claim 1, wherein said controller further includes instructions which, when executed, perform the steps of:

determining whether or not an engine operation stop request to stop an operation of said engine occurs; and determining whether or not ammonia produced by said urea-water for producing ammonia supply control is remaining in said intake passage when said engine operation stop request occurs, and wherein, said controller further includes instructions which, when executed, perform, for a predetermined time, an ammonia eliminating control to have said urea-water supply valve supply no urea-water and to have said fuel injection valve continue to supply said fuel to said engine so that said engine continues to be operated, when it is determined that said ammonia is remaining in said intake passage.

13. The exhaust system according to claim 12, wherein said controller further includes instructions which, when executed, perform the steps of:

estimating a first gas amount which is an integrated amount of a gas passing through said low pressure EGR passage after a stop of an execution of said urea-water for producing ammonia supply control;

determining whether or not said estimated first gas amount becomes equal to or larger than a volume of said low pressure EGR passage; and further estimate a second gas amount which is an integrated amount of a gas passing through said intake passage after a point in time at which said estimated first gas amount becomes equal to or larger than said volume of said low pressure EGR passage, and wherein, determining that said ammonia is remaining in said intake passage in a case in which said estimated second gas amount is not equal to or larger than a volume of said intake passage when said engine operation stop request occurs.

14. The exhaust system according to claim 13, wherein said controller further includes instructions which, when executed, perform stopping said ammonia eliminating control to stop said operation of said engine when said estimated second gas amount becomes equal to or larger than said volume of said intake passage.

\* \* \* \* \*